US009515715B2

(12) United States Patent
Zhang et al.

(10) Patent No.: US 9,515,715 B2
(45) Date of Patent: Dec. 6, 2016

(54) CSI FEEDBACK METHOD, UE SCHEDULING METHOD, UE, AND BASE STATION

(71) Applicant: Huawei Technologies Co., Ltd., Shenzhen, Guangdong (CN)

(72) Inventors: Yongping Zhang, Beijing (CN); Yue Wang, Beijing (CN); Yu Liu, Beijing (CN); Guanhong Lai, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/979,388

(22) Filed: Dec. 27, 2015

(65) Prior Publication Data

US 2016/0149629 A1 May 26, 2016

Related U.S. Application Data

(63) Continuation of application No. PCT/CN2014/078474, filed on May 27, 2014.

(30) Foreign Application Priority Data

Jun. 27, 2013 (CN) .......................... 2013 1 0263092

(51) Int. Cl.
*H04B 7/06* (2006.01)
*H04L 1/00* (2006.01)
(Continued)

(52) U.S. Cl.
CPC ........... *H04B 7/0626* (2013.01); *H04L 1/0026* (2013.01); *H04L 1/0027* (2013.01); *H04L 5/0057* (2013.01); *H04L 25/0224* (2013.01)

(58) Field of Classification Search
CPC ............. H04W 72/048; H04B 7/0417; H04B 7/0615–7/0663; H04L 5/0057; H04L 1/0026; H04L 1/0027; H04L 25/0224
See application file for complete search history.

(56) References Cited

U.S. PATENT DOCUMENTS 6,618,761 B2 * 9/2003 Munger .............. H04L 61/2007
370/232
2005/0129137 A1 * 6/2005 Yamada .............. H04B 7/0417
375/267
(Continued)

FOREIGN PATENT DOCUMENTS

CN 101291526 A 10/2008
CN 101415229 A 4/2009
(Continued)

OTHER PUBLICATIONS

Taiwen Tang, et al., "Opportunistic Feedback for Downlink Multiuser Diversity", IEEE Communications Letters, vol. 9, No. 10, Oct. 2005, p. 948-950.
(Continued)

*Primary Examiner* — Edan Orgad
*Assistant Examiner* — Ivan O Latorre

(57) ABSTRACT

The present invention discloses a channel state information (CSI) feedback method. The CSI feedback method includes: receiving, by user equipment (UE), a reference signal broadcast by a base station; performing channel estimation on a radio channel between the base station and the UE by using the reference signal, to obtain CSI and a channel quality parameter; adjusting the channel quality parameter according to a channel quality weight parameter, to obtain a channel statistic quality parameter; and when the channel statistic quality parameter exceeds a channel quality threshold, feeding back the CSI to the base station. In the present invention, because a channel quality parameter is dynamically adjusted by using a channel quality weight parameter, and it is selected, according to a result of comparing an adjusted channel statistic quality parameter with a channel quality threshold, whether to report CSI. UEs in a system can be evenly scheduled.

15 Claims, 6 Drawing Sheets

(51) Int. Cl.
  *H04L 5/00* (2006.01)
  *H04L 25/02* (2006.01)

(56) References Cited

U.S. PATENT DOCUMENTS

| | | | | |
|---|---|---|---|---|
| 2005/0215219 A1* | 9/2005 | Khorram | ............... | H03J 3/08 455/226.1 |
| 2009/0274204 A1* | 11/2009 | Chen | ............... | H04L 1/0027 375/228 |
| 2009/0316676 A1* | 12/2009 | Kolding | ............... | H04L 1/0026 370/345 |
| 2010/0061258 A1* | 3/2010 | Seo | ............... | H04B 7/0632 370/252 |
| 2011/0134978 A1* | 6/2011 | Au-Yeung | ............... | H04L 1/0026 375/224 |
| 2011/0135020 A1* | 6/2011 | Au-Yeung | ............... | H04B 7/0617 375/260 |
| 2011/0170623 A1 | 7/2011 | Park et al. | | |
| 2013/0010880 A1* | 1/2013 | Koivisto | ............... | H04B 7/0469 375/259 |
| 2013/0094380 A1* | 4/2013 | Taoka | ............... | H04B 7/0417 370/252 |
| 2013/0114428 A1* | 5/2013 | Koivisto | ............... | H04B 7/024 370/252 |
| 2013/0229985 A1* | 9/2013 | Kim | ............... | H04W 72/0426 370/328 |

FOREIGN PATENT DOCUMENTS

| | | |
|---|---|---|
| CN | 102291199 A | 12/2011 |
| CN | 102763345 A | 10/2012 |

OTHER PUBLICATIONS

Shirish Nagaraj et al., "Multiple Antenna Transmission With Channel State Information: A Low-Rate Feedback Approach", IEEE Signal Processing Letters, vol. 11, No. 6, Jun. 2004, p. 573-576.

* cited by examiner

CSI FEEDBACK METHOD, UE SCHEDULING METHOD, UE, AND BASE STATION

CROSS-REFERENCE TO RELATED APPLICATION

This application is a continuation of International Application No. PCT/CN2014/078474, filed on May 27, 2014, which claims priority to Chinese Patent Application No. 201310263092.8, filed on Jun. 27, 2013, both of which are incorporated herein by reference in their entireties.

TECHNICAL FIELD

The present invention relates to the field of communications technologies, and in particular, to a Channel State Information (CSI) feedback method, a User Equipment (UE) scheduling method, UE, and a base station.

BACKGROUND

In a Frequency Division Duplexing (FDD) communications system, a base station of a cell usually needs to provide a service to multiple UEs connected to the cell; however, due to limited communication resources, the base station needs to provide a service preferentially to a few UEs having better channel quality according to channel quality of UEs. Specifically, the base station transmits a downlink reference signal, and UE calculates downlink channel quality according to the received downlink reference signal, and feeds back CSI to the base station according to the downlink channel quality. After receiving the CSI reported by each UE, the base station selects, according to a preset scheduling policy, several UEs from all UEs connected to the cell, so that the base station provides a service to the several UEs.

When a large quantity of UEs exist in the cell, the base station can provide a service only to a limited quantity of UEs of the large quantity of UEs; however, because all UEs need to report CSI to the base station, unscheduled UEs report CSI and therefore occupy a large number of uplink communication resources. Therefore, in the prior art, to reduce an overhead for CSI feedback, the base station may broadcast one threshold to the UEs, and only UE whose channel quality exceeds the threshold feeds back CSI to the base station. However, because channel quality of UEs at edges of the cell is usually relatively poor and is always less than the threshold broadcast by the base station, it is always difficult for the base station to schedule these UEs, and these UEs cannot use a service provided by the base station, resulting in that performance of the UEs at the edges of the cell is not high.

SUMMARY

Embodiments of the present invention provide a CSI feedback method, a UE scheduling method, UE, and a base station, so as to resolve a problem that a UE scheduling manner in an existing FDD communications system easily causes that performance of UE at an edge of a cell is not high.

A first aspect provides a CSI feedback method, where the method includes:
receiving, by UE, a reference signal broadcast by a base station;

performing channel estimation on a radio channel between the base station and the UE by using the reference signal, to obtain channel state information CSI and a channel quality parameter;
adjusting the channel quality parameter according to a channel quality weight parameter, to obtain a channel statistic quality parameter;
comparing the channel statistic quality parameter with a channel quality threshold; and
feeding back the CSI to the base station when the channel statistic quality parameter exceeds the channel quality threshold.

With reference to the first aspect, in a first possible implementation manner of the first aspect, the adjusting the channel quality parameter according to a channel quality weight parameter, to obtain a channel statistic quality parameter includes: determining that a product of the channel quality weight parameter and the channel quality parameter is the channel statistic quality parameter; and
after the comparing the channel statistic quality parameter with a channel quality threshold, the method further includes:
when the channel statistic quality parameter exceeds the channel quality threshold, updating the channel quality weight parameter by using a step adjustment value, where the channel quality weight parameter after being updated is less than the channel quality weight parameter before being updated; or,
when the channel statistic quality parameter does not exceed the channel quality threshold, updating the channel quality weight parameter by using the step adjustment value, where the channel quality weight parameter after being updated is greater than the channel quality weight parameter before being updated.

With reference to the first aspect, or the first possible implementation manner of the first aspect, in a second possible implementation manner of the first aspect, the feeding back the CSI to the base station includes: feeding back the CSI to the base station by using a time-frequency resource allocated by the base station to the UE.

With reference to the first aspect, or the first possible implementation manner of the first aspect, in a third possible implementation manner of the first aspect, before the receiving, by UE, a reference signal broadcast by a base station, the method further includes: receiving a coding sequence seed allocated by the base station to the UE; and
the feeding back the CSI to the base station includes:
generating an M-dimensional Gaussian random sequence according to the coding sequence seed, where M is an integer greater than 1;
coding the CSI by using the M-dimensional Gaussian random sequence, to obtain an M-dimensional vector signal; and
feeding back the M-dimensional vector signal to the base station by using M sub-resources.

With reference to the first aspect, or the first possible implementation manner of the first aspect, in a fourth possible implementation manner of the first aspect, the performing channel estimation on a radio channel between the base station and the UE by using the reference signal, to obtain CSI and a channel quality parameter includes:
calculating a channel quality parameter of the reference signal on each subband of multiple subbands obtained by dividing a channel bandwidth;
selecting, from the multiple subbands, a subband having an optimal channel quality parameter, and determining that the subband having the optimal channel quality parameter is an optimal subband of the UE; and performing channel estimation on the radio channel between the base station and the UE by using the reference signal, to obtain CSI of the UE on the optimal subband;

the adjusting the channel quality parameter according to a channel quality weight parameter, to obtain a channel statistic quality parameter includes: adjusting the channel quality parameter of the optimal subband according to the channel quality weight parameter, to obtain a channel statistic quality parameter of the optimal subband;

the comparing the channel statistic quality parameter with a channel quality threshold includes: comparing the channel statistic quality parameter of the optimal subband with the channel quality threshold; and the feeding back the CSI to the base station when the channel statistic quality parameter exceeds the channel quality threshold includes: when the channel statistic quality parameter of the optimal subband exceeds the channel quality threshold, feeding back, to the base station in a feedback stage which the optimal subband corresponds to, the CSI on the optimal subband.

With reference to the fourth possible implementation manner of the first aspect, in a fifth possible implementation manner of the first aspect, before the receiving, by UE, a reference signal broadcast by a base station, the method further includes: receiving a coding sequence seed allocated by the base station to the UE; and the feeding back, to the base station in a feedback stage which the optimal subband corresponds to, the CSI on the optimal subband includes:

generating an M-dimensional Gaussian random sequence according to the coding sequence seed, where M is an integer greater than 1;

coding the CSI on the optimal subband by using the M-dimensional Gaussian random sequence, to obtain an M-dimensional vector signal; and feeding back, in the feedback stage which the optimal subband corresponds to, the M-dimensional vector signal to the base station by using M sub-resources.

With reference to the one or more of the embodiments disclosed herein, an initial value of the channel quality weight parameter is a preset weight parameter.

A second aspect provides a UE scheduling method, where the method includes:

broadcasting, by a base station, a reference signal, so that UEs that receive the reference signal perform channel estimation on radio channels between the base station and the UEs by using the reference signal, to obtain CSI and channel quality parameters;

obtaining CSI fed back by first UEs, where the first UEs are UEs, whose channel statistic quality parameters exceed a channel quality threshold, of the UEs that receive the reference signal, and the channel statistic quality parameter is a parameter obtained after the first UE adjusts a channel quality parameter of the first UE according to a channel quality weight parameter; and selecting UE from the first UEs according to the CSI fed back by the first UEs, and scheduling the UE.

With reference to the second aspect, in a first possible implementation manner of the second aspect, the obtaining CSI fed back by first UEs includes: receiving the CSI that is fed back by the first UEs to the base station by using time-frequency resources allocated by the base station to the first UEs.

With reference to the second aspect, in a second possible implementation manner of the second aspect, before the broadcasting, by a base station, a reference signal, the method further includes: allocating a coding sequence seed to each UE; and the obtaining CSI fed back by first UEs includes:

receiving M-dimensional vector signals fed back by using M sub-resources by the first UEs, where the M-dimensional vector signal is an M-dimensional vector signal obtained after the first UE generates an M-dimensional Gaussian random sequence according to the allocated coding sequence seed, and codes the CSI by using the M-dimensional Gaussian random sequence, where M is an integer greater than 1; and reconstructing the M-dimensional vector signals, to obtain the CSI of each UE of the first UEs.

With reference to the second aspect, in a third possible implementation manner of the second aspect, the obtaining CSI fed back by first UEs includes: in a feedback stage corresponding to any one subband of multiple subbands obtained by dividing a channel bandwidth, obtaining first CSI fed back by first UEs that use the one subband as an optimal subband, where the optimal subband is a subband that is selected, after the first UE calculates a channel quality parameter of the reference signal on each subband of the multiple subbands, from the multiple subbands and has an optimal channel quality parameter, and the first CSI is CSI, of the first UE on the optimal subband, obtained after the first UE performs channel estimation on the radio channel between the base station and the UE by using the reference signal; and the selecting UE from the first UEs according to the CSI fed back by the first UEs, and scheduling the UE includes: in the feedback stage corresponding to the any one subband, selecting UE from the first UEs according to the first CSI fed back by the first UEs that use the one subband as the optimal subband, and scheduling the UE on the one subband.

With reference to the third possible implementation manner of the second aspect, in a fourth possible implementation manner of the second aspect, before the broadcasting, by a base station, a reference signal, the method further includes: allocating a coding sequence seed to each UE; and the obtaining first CSI fed back by first UEs that use the one subband as an optimal subband includes:

receiving M-dimensional vector signals fed back by using M sub-resources by the first UEs that use the one subband as the optimal subband, where the M-dimensional vector signal is an M-dimensional vector signal obtained after the first UE generates an M-dimensional Gaussian random sequence according to the allocated coding sequence seed, and codes the first CSI by using the M-dimensional Gaussian random sequence, where M is an integer greater than 1; and reconstructing the M-dimensional vector signals, to obtain the first CSI fed back on the one subband by each UE of the first UEs.

A third aspect provides UE, the UE including:

a receiving unit, configured to receive a reference signal broadcast by a base station;

an estimation unit, configured to perform channel estimation on a radio channel between the base station and the UE by using the reference signal received by the receiving unit, to obtain channel state information CSI and a channel quality parameter;

an adjustment unit, configured to adjust, according to a channel quality weight parameter, the channel quality parameter obtained by the estimation unit, to obtain a channel statistic quality parameter;

a comparison unit, configured to compare the channel statistic quality parameter obtained by the adjustment unit with a channel quality threshold; and a feedback unit, configured to: when a comparison result of the comparison unit is that the channel statistic quality parameter exceeds the channel quality threshold, feed back, to the base station, the CSI obtained by the estimation unit.

With reference to the third aspect, in a first possible implementation manner of the third aspect, the adjustment unit is specifically configured to determine that a product of the channel quality weight parameter and the channel quality parameter that is obtained by the estimation unit is the channel statistic quality parameter; and the UE further includes:

an update unit, configured to: when the comparison result of the comparison unit is that the channel statistic quality parameter exceeds the channel quality threshold, update the channel quality weight parameter by using a step adjustment value to obtain a first channel quality weight parameter, where the channel quality weight parameter after being updated is less than the channel quality weight parameter before being updated; or, when the comparison result of the comparison unit is that the channel statistic quality parameter does not exceed the channel quality threshold, update the channel quality weight parameter by using the step adjustment value to obtain a second channel quality weight parameter, where the channel quality weight parameter after being updated is greater than the channel quality weight parameter before being updated.

With reference to the third aspect, or the first possible implementation manner of the third aspect, in a second possible implementation manner of the third aspect, the feedback unit is specifically configured to feed back the CSI to the base station by using a time-frequency resource allocated by the base station to the UE.

With reference to the third aspect, or the first possible implementation manner of the third aspect, in a third possible implementation manner of the third aspect, the receiving unit is further configured to receive a coding sequence seed allocated by the base station to the UE; and the feedback unit includes:

a first sequence generation subunit, configured to generate an M-dimensional Gaussian random sequence according to the coding sequence seed received by the receiving unit, where M is an integer greater than 1;

a first CSI coding subunit, configured to code the CSI by using the M-dimensional Gaussian random sequence generated by the first sequence generation subunit, to obtain an M-dimensional vector signal; and a first signal feedback subunit, configured to feed back, to the base station by using M sub-resources, the M-dimensional vector signal obtained by the first CSI coding subunit.

With reference to the third aspect, or the first possible implementation manner of the third aspect, in a fourth possible implementation manner of the third aspect, the estimation unit includes:

a quality calculation subunit, configured to calculate a channel quality parameter, of the reference signal received by the receiving unit, on each subband of multiple subbands obtained by dividing a channel bandwidth;

a subband selection subunit, configured to select, from the multiple subbands, a subband having an optimal channel quality parameter calculated by the quality calculation subunit, and determine that the subband having the optimal channel quality parameter is an optimal subband of the UE;

a CSI estimation subunit, configured to perform channel estimation on a radio channel between the base station and the UE by using the reference signal, to obtain CSI of the UE on the optimal subband selected by the subband selection subunit;

the adjustment unit is specifically configured to adjust, according to the channel quality weight parameter, the channel quality parameter of the optimal subband selected by the subband selection subunit, to obtain a channel statistic quality parameter of the optimal subband;

the comparison unit is specifically configured to compare the channel statistic quality parameter, of the optimal subband, obtained by the adjustment unit with the channel quality threshold; and the feedback unit is specifically configured to: when the comparison result of the comparison unit is that the channel statistic quality parameter of the optimal subband exceeds the channel quality threshold, feed back, to the base station in a feedback stage which the optimal subband corresponds to, the CSI on the optimal subband.

With reference to the fourth possible implementation manner of the third aspect, in a fifth possible implementation manner of the third aspect, the receiving unit is further configured to receive a coding sequence seed allocated by the base station to the UE; and the feedback unit includes:

a second sequence generation subunit, configured to generate an M-dimensional Gaussian random sequence according to the coding sequence seed received by the receiving unit, where M is an integer greater than 1;

a second CSI coding subunit, configured to code the CSI on the optimal subband by using the M-dimensional Gaussian random sequence generated by the second sequence generation subunit, to obtain an M-dimensional vector signal; and a second signal feedback subunit, configured to feeding back, by using M sub-resources to the base station in the feedback stage which the optimal subband corresponds to, the M-dimensional vector signal obtained by the second CSI coding subunit.

A fourth aspect provides a base station, the base station including:

a broadcast unit, configured to broadcast a reference signal, so that UEs that receive the reference signal perform channel estimation on radio channels between the base station and the UEs by using the reference signal, to obtain CSI and channel quality parameters;

an obtaining unit, configured to obtain CSI fed back by first UEs, where the first UEs are UEs, whose channel statistic quality parameters exceed a channel quality threshold, of the UEs that receive the reference signal broadcast by the broadcast unit, where the channel statistic quality parameter is a parameter obtained after the first UE adjusts a channel quality parameter of the first UE according to a channel quality weight parameter; and a scheduling unit, configured to select UE from the first UEs according to the CSI fed back by the first UEs and obtained by the obtaining unit, and schedule the UE.

With reference to the fourth aspect, in a first possible implementation manner of the fourth aspect, the obtaining unit is specifically configured to receive the CSI that is fed back by the first UEs to the base station by using time-frequency resources allocated by the base station to the first UEs.

With reference to the fourth aspect, in a second possible implementation manner of the fourth aspect, the base station further includes:

a first allocation unit, configured to allocate a coding sequence seed to each UE; and the obtaining unit includes:

a first signal receiving subunit, configured to receive M-dimensional vector signals fed back by using M sub-resources by the first UEs, where the M-dimensional vector signal is an M-dimensional vector signal obtained after the first UE generates an M-dimensional Gaussian random sequence according to the allocated coding sequence seed, and codes the CSI by using the M-dimensional Gaussian random sequence, where M is an integer greater than 1; and a first signal reconstruction subunit, configured to reconstruct the M-dimensional vector signals received by the signal receiving subunit, to obtain the CSI of each UE of the first UEs.

With reference to the fourth aspect, in a third possible implementation manner of the fourth aspect, the obtaining unit is specifically configured to obtain, in a feedback stage corresponding to anyone subband of multiple subbands obtained by dividing a channel bandwidth, first CSI fed back by first UEs that use the one subband as an optimal subband, where the optimal subband is a subband that is selected, after the first UE calculates a channel quality parameter of the reference signal on each subband of the multiple subbands, from the multiple subbands and has an optimal channel quality parameter, and the first CSI is CSI, of the first UE on the optimal subband, obtained after the first UE performs channel estimation on the radio channel between the base station and the UE by using the reference signal; and the scheduling unit is specifically configured to: in the feedback stage corresponding to the any one subband, select UE from the first UEs according to the first CSI fed back by the first UEs that use the one subband as the optimal subband and obtained by the obtaining unit, and schedule the UE on the one subband.

With reference to the third possible implementation manner of the fourth aspect, in a fourth possible implementation manner of the fourth aspect, the base station further includes:

a second allocation unit, configured to allocate a coding sequence seed to each UE; and the obtaining unit includes:

a first signal receiving subunit, configured to receive M-dimensional vector signals fed back by using M sub-resources by the first UEs that use the one subband as the optimal subband, where the M-dimensional vector signal is an M-dimensional vector signal obtained after the first UE generates an M-dimensional Gaussian random sequence according to the allocated coding sequence seed, and codes the first CSI by using the M-dimensional Gaussian random sequence, where M is an integer greater than 1; and a first signal reconstruction subunit, configured to reconstruct the M-dimensional vector signals received by the first signal receiving subunit, to obtain the first CSI fed back on the one subband by each UE of the first UEs.

A fifth aspect provides UE, the UE including: a radio transceiver and a processor, where the radio transceiver is configured to receive a reference signal broadcast by a base station; and the processor is configured to perform estimation on a radio channel between the base station and the UE by using the reference signal, to obtain channel state information CSI and a channel quality parameter, adjust the channel quality parameter according to a channel quality weight parameter, to obtain a channel statistic quality parameter, compare the channel statistic quality parameter with a channel quality threshold, and when the channel statistic quality parameter exceeds the channel quality threshold, feed back the CSI to the base station by using the radio transceiver.

With reference to the fifth aspect, in a first possible implementation manner of the fifth aspect, the processor is specifically configured to determine that a product of the channel quality weight parameter and the channel quality parameter is the channel statistic quality parameter; and the processor is further configured to: when the channel statistic quality parameter exceeds the channel quality threshold, update the channel quality weight parameter by using a step adjustment value to obtain a first channel quality weight parameter, where the channel quality weight parameter after being updated is less than the channel quality weight parameter before being updated; or, when the channel statistic quality parameter does not exceed the channel quality threshold, update the channel quality weight parameter by using the step adjustment value to obtain a second channel quality weight parameter, where the channel quality weight parameter after being updated is greater than the channel quality weight parameter before being updated.

With reference to the fifth aspect, or the first possible implementation manner of the fifth aspect, in a second possible implementation manner of the fifth aspect, the processor is specifically configured to feed back the CSI to the base station by using the radio transceiver on a time-frequency resource allocated by the base station to the UE.

With reference to the fifth aspect, or the first possible implementation manner of the fifth aspect, in a third possible implementation manner of the fifth aspect, the radio transceiver is further configured to receive a coding sequence seed allocated by the base station to the UE; and the processor is specifically configured to generate an M-dimensional Gaussian random sequence according to the coding sequence seed, code the CSI by using the M-dimensional Gaussian random sequence, to obtain an M-dimensional vector signal, and feed back the M-dimensional vector signal to the base station by using M sub-resources, where M is an integer greater than 1.

With reference to the fifth aspect, or the first possible implementation manner of the fifth aspect, in a fourth possible implementation manner of the fifth aspect, the processor is specifically configured to calculate a channel quality parameter of the reference signal on each subband of multiple subbands obtained by dividing a channel bandwidth, select, from the multiple subbands, a subband having an optimal channel quality parameter, determine that the subband having the optimal channel quality parameter is an optimal subband of the UE, perform channel estimation on a radio channel between the base station and the UE by using the reference signal, to obtain CSI of the UE on the optimal subband, adjust the channel quality parameter of the optimal subband according to the channel quality weight parameter, to obtain a channel statistic quality parameter of the optimal subband, compare the channel statistic quality parameter of the optimal subband with the channel quality threshold, and when the channel statistic quality parameter of the optimal subband exceeds the channel quality threshold, feed back, to the base station in a feedback stage which the optimal subband corresponds to, the CSI on the optimal subband.

With reference to the fourth possible implementation manner of the fifth aspect, in a fifth possible implementation manner of the fifth aspect, the radio transceiver is further configured to receive a coding sequence seed allocated by the base station to the UE; and the processor is specifically configured to generate an M-dimensional Gaussian random sequence according to the coding sequence seed, code the CSI on the optimal subband by using the M-dimensional Gaussian random sequence, to obtain an M-dimensional vector signal, and feed back, in the feedback stage which the optimal subband corresponds to, the M-dimensional vector signal to the base station by using M sub-resources, where M is an integer greater than 1.

A sixth aspect provides a base station, the base station including: a transceiver and a processor, where the transceiver is configured to broadcast a reference signal, so that UEs that receive the reference signal perform channel estimation on radio channels between the base station and the UEs by using the reference signal, to obtain CSI and channel quality parameters;

the processor is configured to obtain CSI fed back by first UEs, select UE from the first UEs according to the CSI fed back by the first UEs, and schedule the UE, where the first UEs are UEs, whose channel statistic quality parameters exceed a channel quality threshold, of the UEs that receive the reference signal, and the channel statistic quality parameter is a parameter obtained after the first UE adjusts a channel quality parameter of the first UE according to a channel quality weight parameter.

With reference to the sixth aspect, in a first possible implementation manner of the sixth aspect, the processor is specifically configured to receive, by using the transceiver, the CSI that is fed back by the first UEs to the base station by using time-frequency resources allocated by the base station to the first UEs.

With reference to the sixth aspect, in a second possible implementation manner of the sixth aspect, the processor is further configured to allocate a coding sequence seed to each UE; and the processor is specifically configured to receive, by using the transceiver, M-dimensional vector signals fed back by using M sub-resources by the first UEs, and reconstruct the M-dimensional vector signals, to obtain the CSI of each UE of the first UEs, where the M-dimensional vector signal is an M-dimensional vector signal obtained after the first UE generates an M-dimensional Gaussian random sequence according to the allocated coding sequence seed, and codes the CSI by using the M-dimensional Gaussian random sequence, where M is an integer greater than 1.

With reference to the sixth aspect, in a third possible implementation manner of the sixth aspect, the processor is specifically configured to obtain, in a feedback stage corresponding to any one subband of multiple subbands obtained by dividing a channel bandwidth, first CSI fed back by first UEs that use the one subband as an optimal subband, select UE from the first UEs according to the first CSI fed back by the first UEs that use the one subband as the optimal subband, and schedule the UE on the one subband, where the optimal subband is a subband that is selected, after the first UE calculates a channel quality parameter of the reference signal on each subband of the multiple subbands, from the multiple subbands and has an optimal channel quality parameter, and the first CSI is CSI, of the first UE on the optimal subband, obtained after the first UE performs channel estimation on the radio channel between the base station and the UE by using the reference signal.

With reference to the third possible implementation manner of the sixth aspect, in a fourth possible implementation manner of the sixth aspect, the processor is further configured to allocate a coding sequence seed to each UE; and the processor is specifically configured to receive, by using the transceiver, M-dimensional vector signals fed back by using M sub-resources by the first UEs that use the one subband as the optimal subband, and reconstruct the M-dimensional vector signals, to obtain the first CSI fed back on the one subband by each UE of the first UEs, where the M-dimensional vector signal is an M-dimensional vector signal obtained after the first UE generates an M-dimensional Gaussian random sequence according to the allocated coding sequence seed, and codes the first CSI by using the M-dimensional Gaussian random sequence, where M is an integer greater than 1.

In the embodiments of the present invention, instead of directly comparing a channel quality parameter with a channel quality threshold, UE dynamically adjusts the channel quality parameter by using a channel quality weight parameter to obtain a channel statistic quality parameter, and selects, according to a result of comparing the channel statistic quality parameter with the channel quality threshold, whether to report CSI; therefore, UEs in a system can be evenly scheduled. For example, for UE that is at an edge of a cell and has relatively poor channel quality, each time after the UE is not scheduled by a base station, a channel quality weight parameter may be increased, so as to increase a channel statistic quality parameter a next time, so that a probability of reporting CSI is increased; for UE having better channel quality, each time after the UE is scheduled by the base station, a channel quality weight parameter may be reduced, so as to reduce a channel statistic quality parameter a next time, so that a probability of reporting CSI is reduced, thereby ensuring that all UEs can be evenly scheduled by the base station.

BRIEF DESCRIPTION OF THE DRAWINGS

To describe the technical solutions in the embodiments of the present invention more clearly, the following briefly introduces the accompanying drawings required for describing the embodiments. Apparently, a person of ordinary skill in the art may still derive other drawings from these accompanying drawings without creative efforts.

DETAILED DESCRIPTION

To make a person skilled in the art understand the technical solutions in the embodiments of the present invention better, and make the objectives, features, and advantages of the embodiments of the present invention clearer, the following further describes the technical solutions in the embodiments of the present invention in detail with reference to the accompanying drawings.

Figure 1A:
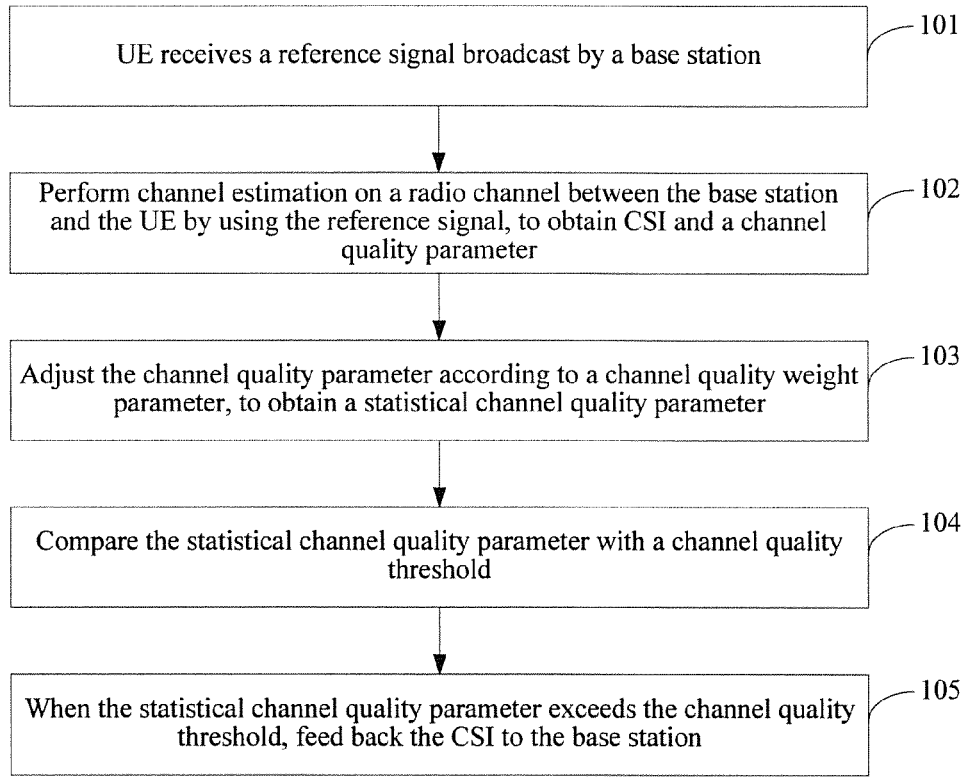
FIG. 1A is a flowchart of an embodiment of a CSI feedback method according to the present invention.

Refer to FIG. 1A, which is a flowchart of an embodiment of a CSI feedback method according to the present invention. In this embodiment, a process of feeding back CSI is described from the perspective of a UE side:

Step 101: UE receives a reference signal broadcast by a base station.

Step 102: Perform channel estimation on a radio channel between the base station and the UE by using the reference signal, to obtain CSI and a channel quality parameter.

In this embodiment, the CSI may be specifically a Precoding Matrix Indicator (PMI), a Channel Quality Indicator (CQI), or the like. The channel quality parameter may be specifically a Signal to Interference plus Noise Ratio (SINR). A process of performing channel estimation on a radio channel between the base station and a corresponding UE by using the reference signal to obtain the CSI and a process of obtaining the channel quality parameter through calculation are the same as those in the prior art, and are no longer elaborated herein.

Step 103: Adjust the channel quality parameter according to a channel quality weight parameter, to obtain a channel statistic quality parameter.

In this embodiment, the UE may determine that a product of the channel quality weight parameter and the channel quality parameter is the channel statistic quality parameter.

Step 104: Compare the channel statistic quality parameter with a channel quality threshold.

Further, according to a result of comparing the channel statistic quality parameter with the channel quality threshold: when the channel statistic quality parameter exceeds the channel quality threshold, the channel quality weight parameter may be updated by using a step adjustment value, where the channel quality weight parameter after being updated is less than the channel quality weight parameter before being updated, so as to adjust, by using the channel quality weight parameter after being updated, the channel quality parameter when the base station schedules the UE a next time, so that the obtained channel statistic quality parameter can be reduced, and a probability that the UE is scheduled is reduced; or when the channel statistic quality parameter does not exceed the channel quality threshold, the channel quality weight parameter may be updated by using the step adjustment value, where the channel quality weight parameter after being updated is greater than the channel quality weight parameter before being updated, so as to adjust, by using the channel quality weight parameter after being updated, the channel quality parameter when the base station schedules the UE a next time, so that the obtained channel statistic quality parameter can be increased, and a probability that the UE is scheduled is increased, thereby implementing that the base station evenly schedules UEs in a cell.

Step 105: When the channel statistic quality parameter exceeds the channel quality threshold, feed back the CSI to the base station.

In this embodiment, the base station may select UE according to a preset scheduling policy from UEs that feed back the CSI, and schedule the UE, and provide a service to the selected UE. When UE to be scheduled is being selected from the UEs that feed back the CSI, an existing scheduling policy may be used; for example, a proportional fair scheduling algorithm, a round-robin scheduling algorithm, or the like may be used, which is not limited in this embodiment of the present invention.

As can be seen from the foregoing embodiment, instead of directly comparing a channel quality parameter with a channel quality threshold, UE dynamically adjusts the channel quality parameter by using a channel quality weight parameter to obtain a channel statistic quality parameter, and selects, according to a result of comparing the channel statistic quality parameter with the channel quality threshold, whether to report CSI; therefore, UEs in a system can be evenly scheduled.

Figure 1B:
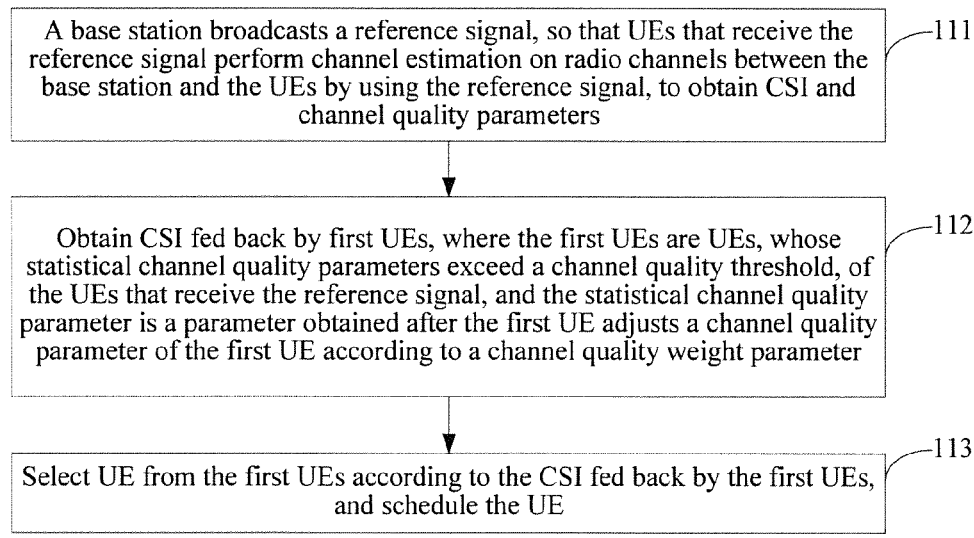
FIG. 1B is a flowchart of an embodiment of a UE scheduling method according to the present invention.

Refer to FIG. 1B, which is a flowchart of an embodiment of a UE scheduling method according to the present invention. In this embodiment, a process of scheduling UE is described from the perspective of a base station side:

Step 111: A base station broadcasts a reference signal, so that UEs that receive the reference signal perform channel estimation on radio channels between the base station and the UEs by using the reference signal, to obtain CSI and channel quality parameters.

Step 112: Obtain CSI fed back by first UEs, where the first UEs are UEs, whose channel statistic quality parameters exceed a channel quality threshold, of the UEs that receive the reference signal, and the channel statistic quality parameter is a parameter obtained after the first UE adjusts a channel quality parameter of the first UE according to a channel quality weight parameter.

In an optional implementation manner, the base station may receive the CSI that is fed back by the first UEs to the base station by using time-frequency resources allocated by the base station to the first UEs.

In another optional implementation manner, the base station may allocate a coding sequence seed to each UE in advance, and receive M-dimensional vector signals fed back by using M sub-resources by the first UEs, where the M-dimensional vector signal is an M-dimensional vector signal obtained after the first UE generates an M-dimensional Gaussian random sequence according to the allocated coding sequence seed, and codes the CSI by using the M-dimensional Gaussian random sequence, where M is an integer greater than 1; and the base station reconstructs the M-dimensional vector signals, to obtain the CSI of each UE of the first UEs.

In another optional implementation manner, the base station may obtain, in a feedback stage corresponding to any one subband of multiple subbands obtained by dividing a channel bandwidth, first CSI fed back by first UEs that use the one subband as an optimal subband, where the optimal subband is a subband that is selected, after the first UE calculates a channel quality parameter of the reference signal on each subband of the multiple subbands, from the multiple subbands and has an optimal channel quality parameter, and the first CSI is CSI, of the first UE on the optimal subband, obtained after the first UE performs channel estimation on the radio channel between the base station and the UE by using the reference signal. Further, if the base station allocates a coding sequence seed to each UE in advance, the base station may receive M-dimensional vector signals fed back by using M sub-resources by the first UEs that use the one subband as the optimal subband, where the M-dimensional vector signal is an M-dimensional vector signal obtained after the first UE generates an M-dimensional Gaussian random sequence according to the allocated coding sequence seed, and codes the first CSI by using the M-dimensional Gaussian random sequence, where M is an integer greater than 1; and the base station reconstructs the M-dimensional vector signals, to obtain the first CSI fed back on the one subband by each UE of the first UEs.

Step 113: Select UE from the first UEs according to the CSI fed back by the first UEs, and schedule the UE.

As can be seen from the foregoing embodiment, instead of directly comparing a channel quality parameter with a channel quality threshold, UE dynamically adjusts the channel quality parameter by using a channel quality weight parameter to obtain a channel statistic quality parameter, and selects, according to a result of comparing the channel statistic quality parameter with the channel quality threshold, whether to report CSI; therefore, UEs in a system can be evenly scheduled.

In embodiments shown in FIG. 2 to FIG. 4 below, a process of scheduling UE is described in detail by using interaction between UE and a base station. For ease of description, it is assumed that there are in total N UEs in a cell, where K UEs select, according to a channel quality threshold, whether to report CSI to the base station, and the cell can only provide a service to L UEs of the K UEs at the same time, where N, K, and L are all integers, L is less than K, and K is far less than N.

Figure 2:
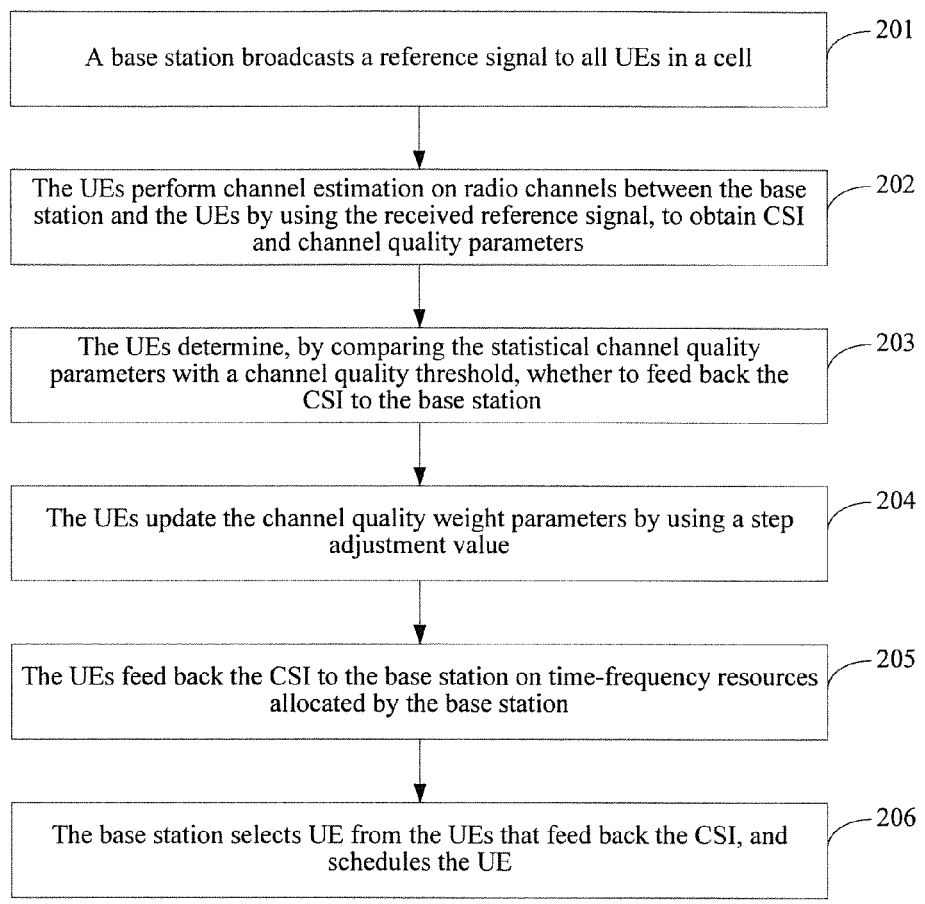
FIG. 2 is a flowchart of another embodiment of a UE scheduling method according to the present invention.

Refer to FIG. 2, which is a flowchart of another embodiment of a UE scheduling method according to the present invention.

Step 201: Abase station broadcasts a reference signal to all UEs in a cell.

Step 202: The UEs perform channel estimation on radio channels between the base station and the UEs by using the received reference signal, to obtain CSI and channel quality parameters.

After receiving the reference signal, the UEs calculate the channel quality parameters, perform channel estimation on the radio channels between the UEs and the base station by using the reference signal, to obtain the CSI, and then adjust the channel quality parameters according to channel quality weight parameters, to obtain channel statistic quality parameters. Assuming that the channel quality parameter is $q_i$, the channel statistic quality parameter is $x_i = q_i \times \beta_i$, where $\beta_i$ is the channel quality weight parameter, and usually when the UE calculates the channel statistic quality parameter $x_i$ for the first time, $\beta_i = 1$.

In this embodiment, the channel quality parameter may be specifically a SINR. The CSI may be specifically a PMI, a CQI, or the like.

Step 203: The UEs determine, by comparing channel statistic quality parameters with a channel quality threshold, whether to feed back the CSI to the base station.

In this embodiment, the UE compares the channel statistic quality parameter $x_i$ obtained through calculation with the channel quality threshold. If $x_i$ is greater than the channel quality threshold, the UE feeds back the CSI to the base station; or if $x_i$ is not greater than the channel quality threshold, the UE does not feed back the CSI to the base station.

In this embodiment, a manner of setting the channel quality threshold may be flexibly selected. For example, a static configuration manner may be used, that is, both the base station and the UE configure a fixed channel quality threshold in advance in a manner of an experimental simulation; or, a semi-static configuration manner may also be used, that is, the base station collects statistics on a performance parameter of a system within a period of time, where the performance parameter may be a Hybrid Automatic Repeat Request (HARQ) of UE to which the base station provides a service, or may be a throughput of a system. If it is determined according to the performance parameter that a degree of a decrease in system performance exceeds a preset value, it indicates that the channel quality threshold is set relatively low, causing that an excessively large quantity of UEs can feed back CSI, and resources required for CSI feedback are increased, which accordingly causes that a delay in feedback is increased, and the system performance is reduced; therefore, the base station may notify the UEs by using signaling, so that the UEs increase the channel quality threshold by one step.

Step 204: The UEs update the channel quality weight parameters by using a step adjustment value.

If the $i^{th}$ user equipment $UE_i$ in the cell feeds back the CSI to the base station, that is, a channel statistic quality parameter of $UE_i$ exceeds the channel quality threshold, the UE, adjusts the channel quality weight parameter $\beta_i = \beta_i - \sigma$, or $\beta_i = \beta_i/(1+\sigma)$; if the $i^{th}$ user equipment $UE_i$ in the cell does not feed back the CSI to the base station, that is, the channel statistic quality parameter of $UE_i$ does not exceed the channel quality threshold, $UE_i$ adjusts the channel quality weight parameter $\beta_i = \beta_i - \sigma$, or $\beta_i = \beta_i/(1+\sigma)$, where $\sigma$ is the step adjustment value of the channel quality weight parameter $\beta_i$, and $\sigma$ may be flexibly set according to a need, for example, may be set to 0.2, or may also be set to 0.1, which is not limited in this embodiment of the present invention.

In this embodiment, because $UE_i$ in the cell may adjust the channel quality weight parameter $\beta_i$ according to a feedback condition of CSI, for $UE_i$ that reports the CSI a current time, the adjusted $\beta_i$ becomes smaller, and the channel statistic quality parameter $x_i = q_i \times \beta_i$ calculated a next time according to the adjusted $\beta_i$ becomes smaller, so that a probability that $UE_i$ feeds back CSI a next time is reduced, that is, a probability that $UE_i$ is scheduled by the base station a next time is reduced; and for $UE_i$ that does not report the CSI a current time, the adjusted $\beta_i$ becomes larger, and the channel statistic quality parameter $x_i \times q_i \times \beta_i$ calculated a next time according to the adjusted $\beta_i$ becomes larger, so that a probability that $UE_i$ feeds back CSI a next time is increased, that is, a probability that $UE_i$ is scheduled by the base station a next time is increased.

As can be seen, in this embodiment of the present invention, the channel quality weight parameter $\beta_i$ is adjusted each time after channel quality estimation is performed, so that for UE that is not selected and scheduled a current time, a probability that the UE is selected and scheduled when a next time CSI is feedback may be increased, that is, UEs in the cell can be evenly scheduled, and a throughput of UE having relatively poor channel quality, especially UE at an edge of the cell, is ensured, thereby improving system fairness.

Step 205: The UEs feed back the CSI to the base station on time-frequency resources allocated by the base station.

In this embodiment, the base station allocates independent orthogonal time-frequency resources to all UEs in the cell. When $UE_i$ determines to feed back the CSI, the CSI of the $UE_i$ is fed back to i the base station on the orthogonal time-frequency resource allocated by the base station to the $UE_i$. When $UE_i$ determines not to feed back the CSI, no information is fed back to the base station.

Step 206: The base station selects UE from the UEs that feed back the CSI, and schedules the UE.

In this embodiment, the base station receives the CSI fed back by K UEs. The base station selects L UEs from K UEs according to a preset scheduling policy, schedules the L UEs, and provides a service to the L UEs. When the L UEs are being selected from the K UEs, an existing scheduling policy may be used; for example, a proportional fair scheduling algorithm, a round-robin scheduling algorithm, or the like may be used, which is not limited in this embodiment of the present invention.

As can be seen from the foregoing embodiment, in this embodiment, instead of directly comparing a channel quality parameter with a channel quality threshold, UE dynamically adjusts the channel quality parameter by using a channel quality weight parameter to obtain a channel statistic quality parameter, and selects, according to a result of comparing the channel statistic quality parameter with the channel quality threshold, whether to report CSI; therefore, UEs in a system can be evenly scheduled.

Figure 3:
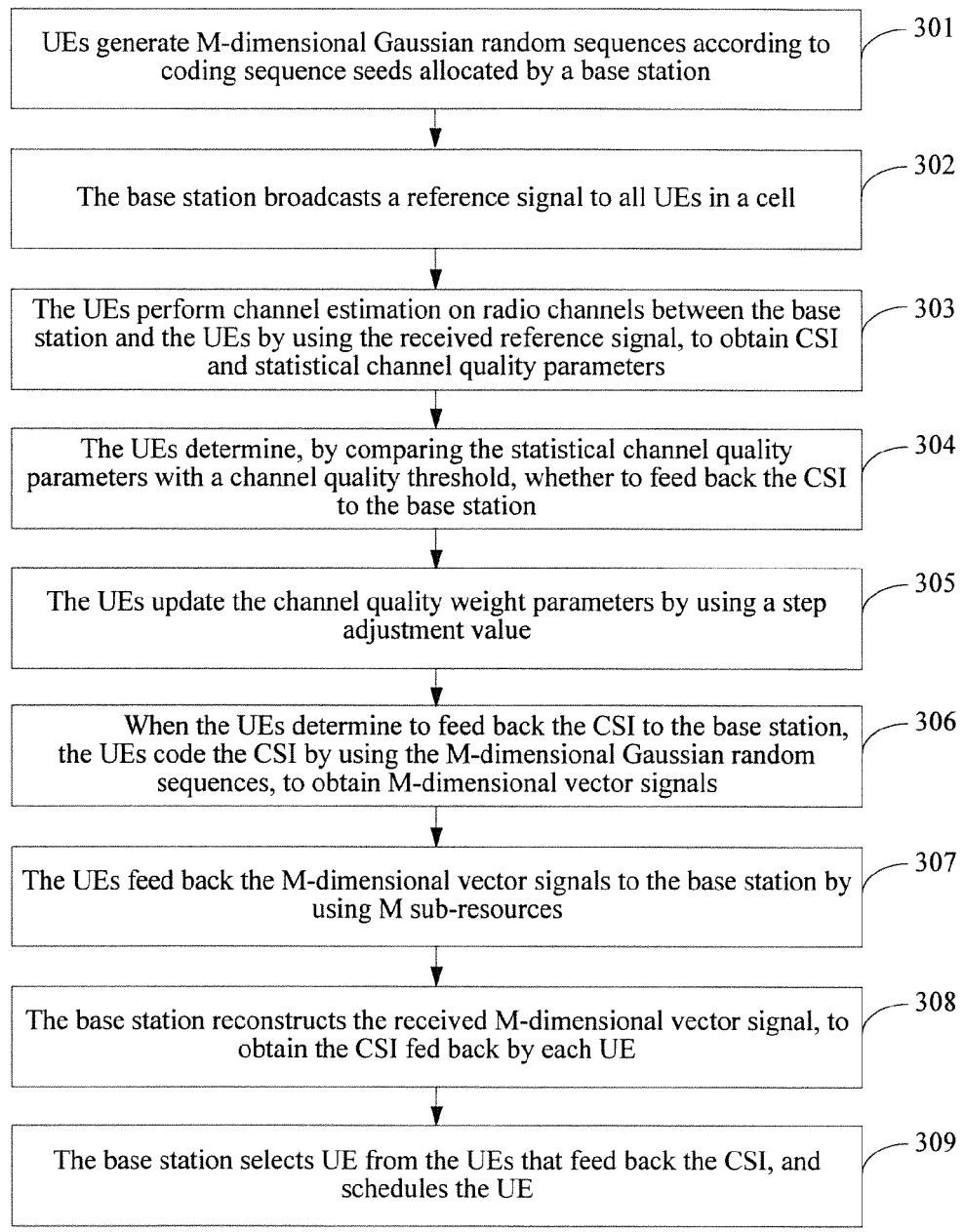
FIG. 3 is a flowchart of still another embodiment of a UE scheduling method according to the present invention.

Refer to FIG. 3, which is a flowchart of still another embodiment of a UE scheduling method according to the present invention.

Step 301: UEs generate M-dimensional Gaussian random sequences according to coding sequence seeds allocated by a base station.

In this embodiment, multiple UEs are connected to a same cell, and the base station of the cell may allocate a unique UE sequence number to each UE, and deliver the allocated UE sequence number to the corresponding UE, where the UE sequence number may also be referred to as a coding sequence seed. Each UE may generate an M-dimensional Gaussian random sequence by using a coding sequence seed of the UE, where M is an integer greater than 1.

The M-dimensional Gaussian random sequence generated by $UE_i$ is represented as $(\phi_{1i}, \phi_{2i}, \ldots, \phi_{Mi})$. Because a coding sequence seed of UE is allocated by the base station, on a base station side, the base station may also generate the M-dimensional Gaussian random sequence of each UE according to the coding sequence seed of each UE.

Step 302: The base station broadcasts a reference signal to all UEs in a cell.

Step 303: The UEs perform channel estimation on radio channels between the base station and the UEs by using the received reference signal, to obtain CSI and channel statistic quality parameters.

After receiving the reference signal, the UEs calculate channel quality parameters, perform channel estimation on the radio channels between the UEs and the base station by using the reference signal, to obtain the CSI, and then adjust the channel quality parameters according to channel quality weight parameters, to obtain the channel statistic quality parameters. Assuming that the channel quality parameter is $q_i$, the channel statistic quality parameter is $x_i=q_i \times \beta_i$, where $\beta_i$ is the channel quality weight parameter, and usually when the UE calculates the channel statistic quality parameter $x_i$ for the first time, $\beta_i=1$.

In this embodiment, the channel quality parameter may be specifically a SINR. The CSI may be specifically a PMI, a CQI, or the like.

Step 304: The UEs determine, by comparing the channel statistic quality parameters with a channel quality threshold, whether to feed back the CSI to the base station.

In this embodiment, the UE compares the channel statistic quality parameter $x_i$ obtained through calculation with the channel quality threshold. If $x_i$ is greater than the channel quality threshold, the UE feeds back the CSI to the base station; or if $x_i$ is not greater than the channel quality threshold, the UE does not feed back the CSI to the base station.

In this embodiment, a manner of setting the channel quality threshold may be flexibly selected. For example, a static configuration manner may be used, that is, both the base station and the UE configure a fixed channel quality threshold in advance in a manner of an experimental simulation; or, a semi-static configuration manner may also be used, that is, the base station collects statistics on a performance parameter of a system within a period of time, where the performance parameter may be a HARQ of UE to which the base station provides a service, or may be a throughput of a system. If it is determined according to the performance parameter that a degree of a decrease in system performance exceeds a preset value, it indicates that the channel quality threshold is set relatively low, causing that an excessively large quantity of UEs can feed back CSI, and resources required for CSI feedback are increased, which accordingly causes that a delay in feedback is increased, and the system performance is reduced; therefore, the base station may notify the UEs by using signaling, so that the UEs increase the channel quality threshold by one step.

Step 305: The UEs update the channel quality weight parameters by using a step adjustment value.

If the $i^{th}$ user equipment $UE_i$ in the cell feeds back the CSI to the base station, that is, a channel statistic quality parameter of $UE_i$ exceeds the channel quality threshold, the $UE_i$ adjusts the channel quality weight parameter $\beta_i=\beta_i-\sigma$, $\beta_i=\beta_i/(1+\sigma)$; if the $i^{th}$ user equipment $UE_i$ in the cell does not feed back the CSI to the base station, that is, the channel statistic quality parameter of $UE_i$ does not exceed the channel quality threshold, $UE_i$ adjusts the channel quality weight parameter $\beta_i=\beta_i-\sigma$, or $\beta_i=\beta_i/(1-\sigma)$, where $\sigma$ is the step adjustment value of the channel quality weight parameter $\beta_i$, and $\sigma$ may be flexibly set according to a need, for example, may be set to 0.2, or may also be set to 0.1, which is not limited in this embodiment of the present invention.

In this embodiment, because $UE_i$ in the cell may adjust the channel quality weight parameter $\beta_i$ according to a feedback condition of CSI, for $UE_i$ that reports the CSI a current time, the adjusted $\beta_i$ becomes smaller, and the channel statistic quality parameter $x_i=q_i \times \beta_i$ calculated a next time according to the adjusted $\beta_i$ becomes smaller, so that a probability that $UE_i$ feeds back CSI a next time is reduced, that is, a probability that $UE_i$ is scheduled by the base station a next time is reduced; and for $UE_i$ that does not report the CSI a current time, the adjusted $\beta_i$ becomes larger, and the channel statistic quality parameter $x_i=q_i \times \beta_i$ calculated a next time according to the adjusted $\beta_i$ becomes larger, so that a probability that $UE_i$ feeds back CSI a next time is increased, that is, a probability that $UE_i$ is scheduled by the base station a next time is increased.

As can be seen, in this embodiment of the present invention, the channel quality weight parameter $\beta_i$ is adjusted each time after channel quality estimation is performed, so that for UE that is not selected and scheduled a current time, a probability that the UE is selected and scheduled when a next time CSI is fed back may be increased, that is, UEs in the cell can be evenly scheduled, and a throughput of UE having relatively poor channel quality, especially UE at an edge of the cell, is ensured, thereby improving system fairness.

Step 306: When the UEs determine to feed back the CSI to the base station, the UEs code the CSI by using the M-dimensional Gaussian random sequences, to obtain M-dimensional vector signals.

In this embodiment, assuming that $UE_i$ determines to feed back the CSI to the base station, where the CSI is represented as $c_i$, $UE_i$ codes $c_i$ by using the M-dimensional Gaussian random sequence $(\phi_{1i}, \phi_{2i}, \ldots, \phi_{Mi})$ of $UE_i$, and the coded M-dimensional vector signal is represented as $(\phi_{1i}c_i, \phi_{2i}c_i, \ldots, \phi_{Mi}c_i)$.

In this embodiment, an objective of coding is to divide an uplink resource into M sub-resources, and all UEs, needing to feed back the CSI to the base station, in the cell use the M sub-resources together. That is, $UE_i$ feeds back a component $\phi_{1i}c_i$ of the CSI of $UE_i$ on the first sub-resource, feeds back a component $\phi_{2i}c_i$ of the CSI of $UE_i$ on the second sub-resource, . . . , and feeds back a component $\phi_{Mi}c_i$ of the CSI of $UE_i$ on the $M^{th}$ sub-resource.

Step 307: The UEs feedback the M-dimensional vector signals to the base station by using M sub-resources.

In this embodiment, all the UEs that determine to feed back the CSI to the base station use the same M sub-resources, and these UEs send, to the base station, the M-dimensional vector signals obtained through coding in step 306. A coding signal carried on the M sub-resources is $Y=(y_1, y_2, \ldots, y_M)$ and Y may be specifically represented as follows:

$$(y_1, y_2, \cdots, y_M) = \begin{pmatrix} h_{11}\phi_{11} & h_{12}\phi_{12} & \cdots & h_{1N}\phi_{1N} \\ \vdots & & & \\ h_{M1}\phi_{M1} & h_{M2}\phi_{M2} & \cdots & h_{MN}\phi_{MN} \end{pmatrix} \cdot \begin{pmatrix} c_1 \\ \vdots \\ c_N \end{pmatrix}.$$

In the foregoing formula, $h_{ji}$ represents an equivalent channel parameter on the $j^{th}$ uplink resource from $UE_i$ to the base station, and a value range of i is 1 to N, a value range of j is 1 to M, and $h_{ji}$ may be obtained by means of uplink channel measurement, which are no longer elaborated herein. As can be seen from the foregoing formula, $y_i$ represents a component of the coding signal carried on the $i^{th}$ sub-resource of the M sub-resources, and $y_j=\phi_{j1}h_{j1}c_1+\phi_{j2}h_{j2}c_2+\ldots+\phi_{jN}h_{jN}c_N$, that is, $y_j=\pi_{i=1}^{N}h_{ji}\phi_{ji}c_i$.

Step 308: The base station reconstructs the received M-dimensional vector signal, to obtain the CSI fed back by each UE.

As can be seen according to step 307, the base station receives the coding signal carried on the M sub-resources, where a component of the coding signal received on the $j^{th}$ sub-resource may be represented as $y_j=\Sigma_{i=1}^{N}h_{ji}\phi_{ji}c_i$, and the coding signal received on the M sub-resources may be represented as $Y=(y_1, y_2, \ldots, y_M)$.

In this embodiment, the base station performs estimation on radio channels between UEs served by the base station and the base station according to the received coding signal Y and by using the reference signal, to obtain an uplink equivalent channel parameter ($h_{ji}$, j=1, 2, . . . , M, i=1, 2, . . . , N) from each UE to the base station. It should be emphasized here that in a wireless communications system, to maintain a connection to the serving base station of the UE, the UE periodically transmits the reference signal to the serving base station of the UE. Because $\{\phi_{ji}, j=1, 2, \ldots, M, i=1, 2, \ldots, N\}$ is known on a base station side, the base station may reconstruct, based on $\{h_{ji}\phi_{ji}, j=1, 2, \ldots, M, i=1, 2, \ldots, N\}$, CSI signal C. The base station may obtain, according to a reconstruction result, the CSI fed back by K UEs that feedback the CSI.

In this embodiment, if $UE_i$ determines not to feed back the CSI, $c_i$ corresponding to $UE_i$ is 0. Because only K UEs of N UEs feedback the CSI, and most of the UEs do not feedback the CSI, most CSI signal elements in a vector signal $C=(c_1, c_2, \ldots, c_N)$ are 0, that the vector signal C is a sparse signal. In this embodiment, a compressed sensing theory ensures that the base station may reconstruct C by using various reconstruction algorithms, for example, an l1 reconstruction algorithm, and a specific reconstruction process is no longer elaborated herein.

Step 309: The base station selects UE from the UEs that feed back the CSI, and schedules the UE.

In this embodiment, the base station obtains, according to reconstruction in step 308, the CSI fed back by K UEs, and the base station selects L UEs from the K UEs according to a preset scheduling policy, schedules the L UEs, and provides a service to the L UEs. When the L UEs are being selected from the K UEs, an existing scheduling policy may be used; for example, a proportional fair scheduling algorithm, a round-robin scheduling algorithm, or the like may be used, which is not limited in this embodiment of the present invention.

As can be seen from the foregoing embodiment, instead of directly comparing a channel quality parameter with a channel quality threshold, UE dynamically adjusts the channel quality parameter by using a channel quality weight parameter to obtain a channel statistic quality parameter, and selects, according to a result of comparing the channel statistic quality parameter with the channel quality threshold, whether to report CSI; therefore, UEs in a system can be evenly scheduled. Further, because all UEs that feed back CSI can use a same resource to perform feedback, a resource overhead required for CSI feedback can be further reduced.

Figure 4:
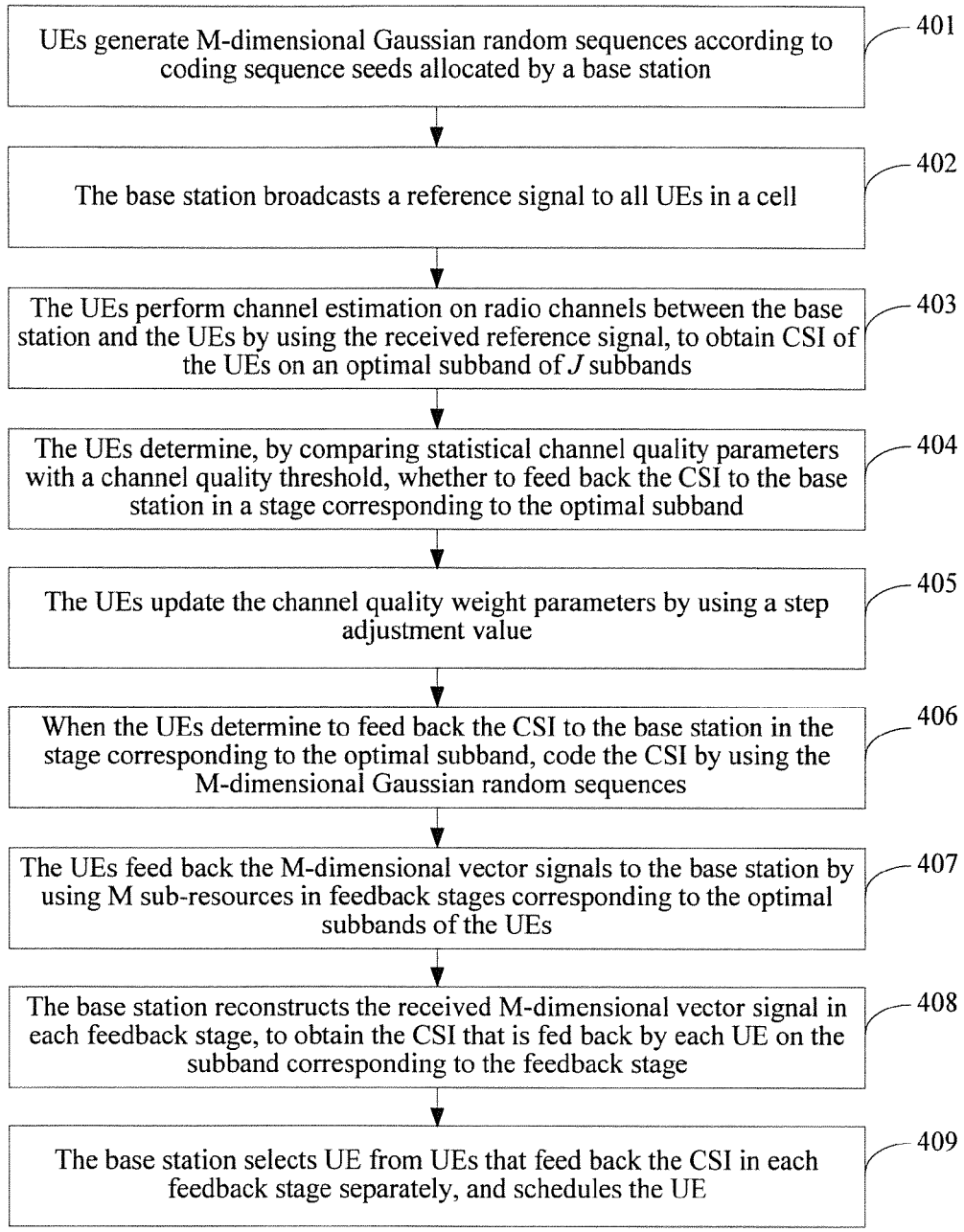
FIG. 4 is a flowchart of yet another embodiment of a UE scheduling method according to the present invention.

Refer to FIG. 4, which is a flowchart of yet another embodiment of a UE scheduling method according to the present invention.

Step 401: UEs generate M-dimensional Gaussian random sequences according to coding sequence seeds allocated by a base station.

In this embodiment, multiple UEs are connected to a same cell, and the base station of the cell may allocate a unique UE sequence number to each UE, and deliver the allocated UE sequence number to the corresponding UE, where the UE sequence number may also be referred to as a coding sequence seed. Each UE may generate an M-dimensional Gaussian random sequence by using a coding sequence seed of the UE, where M is an integer greater than 1.

The M-dimensional Gaussian random sequence generated by is represented as $(\phi_{1i}, \phi_{2i}, \ldots, \phi_{Mi})$. Because a coding sequence seed of UE is allocated by the base station, on a base station side, the base station may also generate the M-dimensional Gaussian random sequence of each UE according to the coding sequence seed of each UE.

Step 402: The base station broadcasts a reference signal to all UEs in a cell.

Step 403: The UEs perform channel estimation on radio channels between the base station and the UEs by using the received reference signal, to obtain CSI of the UEs on an optimal subband of J subbands.

In this embodiment, it is assumed that a channel bandwidth is B, and the UEs divide the channel bandwidth B into J subbands, where J is an integer greater than 1. The base station broadcasts the reference signal to all the UEs in the cell. The UEs calculate a channel quality parameter of each subband, to obtain J channel quality parameters, select, from the J subbands, a subband having an optimal channel quality parameter, determine that the subband having the optimal channel quality parameter is the optimal subband of UEs, calculate a channel statistic quality parameter of the optimal subband, and perform estimation by using the reference signal to obtain the CSI of the UEs on the optimal subband.

Assuming that the channel quality parameter of the optimal subband is $q_i$, the channel statistic quality parameter of the optimal subband is $x_i=q_i \times \beta_i$, where $\beta_i$ is a channel quality weight parameter, and usually when the UE calculates the channel statistic quality parameter $x_i$ for the first time, $\beta_i=1$. In this embodiment, the channel quality parameter may be specifically a SINR. The CSI may be specifically a PMI, a CQI, or the like.

In this embodiment, because the channel bandwidth is divided into the J subbands, a process that the UEs in the cell feed back the CSI to the base station may be divided into J stages in a time order. Correspondingly, the base station schedules the UEs on each subband. Each stage corresponds to one subband, and each UE determines, only on the optimal subband on which the UE has an optimal channel quality parameter, whether to feed back the CSI to the base station, that is, on a subband corresponding to each stage, only the UE that has an optimal channel quality parameter on the subband determines whether to feed back the CSI to the base station on the subband.

Step 404: The UEs determine, by comparing channel statistic quality parameters with a channel quality threshold, whether to feed back the CSI to the base station in a stage corresponding to the optimal subband.

Corresponding to the optimal subband of the UE, the UE compares a channel statistic quality parameter $x_i$, on the optimal subband, obtained through calculation with the channel quality threshold. If $x_i$ is greater than the channel quality threshold, the UE feeds back the CSI to the base station in the stage corresponding to the optimal subband; or if $x_i$ is not greater than the channel quality threshold, the UE does not feed back the CSI to the base station in the stage corresponding to the optimal subband.

In this embodiment, a manner of setting the channel quality threshold may be flexibly selected. For example, a static configuration manner may be used, that is, both the base station and the UE configure a fixed channel quality threshold in advance in a manner of an experimental simulation; or, a semi-static configuration manner may also be used, that is, the base station collects statistics on a performance parameter of a system within a period of time, where the performance parameter may be a HARQ of UE to which the base station provides a service, or may be a throughput of a system. If it is determined according to the performance parameter that a degree of a decrease in system performance exceeds a preset value, it indicates that the channel quality threshold is set relatively low, causing that an excessively large quantity of UEs can feed back CSI, and resources required for CSI feedback are increased, which accordingly causes that a delay in feedback is increased, and the system performance is reduced; therefore, the base station may notify the UEs by using signaling, so that the UEs increase the channel quality threshold by one step.

Step 405: The UEs update the channel quality weight parameters by using a step adjustment value.

If the $i^{th}$ user equipment $UE_i$ in the cell feeds back the CSI to the base station in the stage corresponding to the optimal subband of the $i^{th}$ user equipment, $UE_i$, $UE_i$ adjusts the channel quality weight parameter $\beta_i=\beta_i-\sigma$, or $\beta_i=\beta_i/(1+\sigma)$; if the $i^{th}$ user equipment $UE_i$ in the cell does not feed back the CSI to the base station in the stage corresponding to the optimal subband of the $i^{th}$ user equipment $UE_i$, $UE_i$ adjusts the channel quality weight parameter $\beta_i=\beta_i+\sigma$, or $\beta_i=\beta_i/(1-\sigma)$, where $\sigma$ is the step adjustment value of the channel quality weight parameter $\beta_i$ and $\sigma$ may be flexibly set according to a need, for example, may be set to 0.2, or may also be set to 0.1, which is not limited in this embodiment of the present invention.

As can be seen, in this embodiment of the present invention, the channel quality weight parameter $\beta_i$ is adjusted each time after channel quality estimation is performed, so that for UE that is not selected and scheduled a current time, a probability that the UE is selected and scheduled when a next time CSI is fed back may be increased, that is, UEs in the cell can be evenly scheduled, and a throughput of UE having relatively poor channel quality, especially UE at an edge of the cell, is ensured, thereby improving system fairness.

Step 406: When the UEs determine to feed back the CSI to the base station in the stage corresponding to the optimal subband, code the CSI by using the M-dimensional Gaussian random sequences.

In this embodiment, assuming that $UE_i$ determines to feed back the CSI to the base station in the stage corresponding to the optimal subband, and the CSI is represented as $c_i$, $UE_i$ codes $c_i$ by using the M-dimensional Gaussian random sequence $(\phi_{1i}, \phi_{2i}, \ldots, \phi_{Mi})$ of $UE_i$, and the coded M-dimensional vector signal is represented as $(\phi_{1i}c_i, \phi_{2i}c_i, \ldots, \phi_{Mi}c_i)$.

In this embodiment, an objective of coding is to divide an uplink resource of each subband into M sub-resources, and in the stage corresponding to each subband, all UEs, needing to feed back the CSI to the base station, in the cell may use the M sub-resources together. That is, $UE_i$ feeds back a component $\phi_{1i}c_i$ of the CSI of $UE_i$ on the first sub-resource, feeds back a component $\phi_{2i}c_i$ of the CSI of $UE_i$ on the second sub-resource, . . . , and feeds back a component $\phi_{Mi}c_i$ of the CSI of $UE_i$ on the $M^{th}$ sub-resource.

Step 407: The UEs feed back the M-dimensional vector signals to the base station by using M sub-resources in feedback stages corresponding to the optimal subbands of the UEs.

In this embodiment, the UEs in the cell feed back the CSI to the base station in J stages. Each stage corresponds to one subband. Each UE feeds back the CSI to the base station only in a stage corresponding to the optimal subband of each UE. In each stage, the UEs in the cell feed back the CSI by using the provided M sub-resources. In the first stage, UE whose channel quality parameter is optimal on the first subband sends the M-dimensional vector signal to the base station by using the same M sub-resources; in the second stage, UE whose channel quality parameter is optimal on the second subband sends the M-dimensional vector signal to the base station by using the same M sub-resources; . . . ; in the $J^{th}$ stage, UE whose channel quality parameter is optimal on the $J^{th}$ subband sends the M-dimensional vector signal to the base station by using the same M sub-resources.

In this embodiment, in each feedback stage, the UE that determines to feed back the CSI to the base station sends, to the base station by using the M sub-resources provided by the base station, the M-dimensional vector signal obtained through coding in step 406. A coding signal carried on the M sub-resources is $Y=(y_1, y_2, \ldots, y_M)$, and Y may be specifically represented as follows:

$$(y_1, y_2, \cdots, y_M) = \begin{pmatrix} h_{11}\phi_{11} & h_{12}\phi_{12} & \cdots & h_{1N}\phi_{1N} \\ \vdots & & & \\ h_{M1}\phi_{M1} & h_{M2}\phi_{M2} & \cdots & h_{MN}\phi_{MN} \end{pmatrix} \cdot \begin{pmatrix} c_1 \\ \vdots \\ c_N \end{pmatrix}.$$

In the foregoing formula, $h_{ji}$ represents an equivalent channel parameter on the $j^{th}$ uplink resource from $UE_i$ to the base station in a current stage, a value range of i is 1 to N, a value range of j is 1 to M, $h_{ji}$ may be obtained by means of uplink channel measurement, which are no longer elaborated herein. As can be seen from the foregoing formula, $y_i$ represents a component of the coding signal carried on the $i^{th}$ sub-resource of the M sub-resources, $y_j=\phi_{j1}h_{j1}c_1+\phi_{j2}h_{j2}c_2+\ldots+\phi_{jN}h_{jN}c_N$, that is, $y_j=\Sigma_{i=1}^{N}h_{ji}\phi_{ji}c_i$.

Step 408: The base station reconstructs the received M-dimensional vector signal in each feedback stage, to obtain the CSI that is fed back by each UE on the subband corresponding to the feedback stage.

As can be seen according to step 407, in each feedback stage, the base station receives a vector signal carried on the M sub-resources, where a component of the vector signal received on the $j^{th}$ sub-resource may be represented as $y_j=\Sigma_{i=1}^{N}h_{ji}\phi_{ji}c_i$, and the vector signal received on the M sub-resources may be represented as $Y=(y_1, y_2, \ldots, y_M)$.

In this embodiment, in each feedback stage, the base station performs estimation on a radio channel between the serving base station of the UE and the base station according to the received vector signal Y and by using the reference signal, to obtain an uplink equivalent channel parameter ($h_{ji}$, j=1, 2, ..., M, i=1, 2, ..., N) from each UE to the base station. It should be emphasized here that in a wireless communications system, to maintain a connection to the serving base station of the UE, the UE periodically transmits the reference signal to the serving base station of the UE. Because on a base station side, $\{\phi_{ji}, j=1, 2, ..., M, i=1, 2, ..., N\}$ is known, the base station may reconstruct, based on $\{h_{ji}\phi_{ji}, j=1, 2, ..., M, i=1, 2, ..., N\}$ a CSI signal C in each stage. The base station may obtain, according to a reconstruction result, the CSI fed back by K UEs that feed back the CSI.

In this embodiment, in each stage, if $UE_i$ determines not to feed back the CSI, $c_i$ corresponding to $UE_i$ is 0. Because only K UEs of N UEs feed back the CSI, and most of the UEs do not feed back the CSI, most CSI signal elements in a vector signal $C=(c_1, c_2, ..., c_N)$ are 0, that is, the vector signal C is a sparse signal. In this embodiment, a compressed sensing theory ensures that the base station may reconstruct C by using various reconstruction algorithms, for example, an l1 reconstruction algorithm, and a specific reconstruction process is no longer elaborated herein.

Step 409: The base station selects UE from UEs that feed back the CSI in each feedback stage separately, and schedules the UE.

In this embodiment, in each feedback stage, the base station may obtain, according to reconstruction in step 408, the CSI fed back by K UEs, and the base station selects L UEs from the K UEs according to a preset scheduling policy, schedules the L UEs, and provides a service to the L UEs by using subband resources corresponding to a current feedback stage. When the L UEs are being selected from the K UEs, an existing scheduling policy may be used; for example, a proportional fair scheduling algorithm, a round-robin scheduling algorithm, or the like may be used, which is not limited in this embodiment of the present invention.

As can be seen from the foregoing embodiment, instead of directly comparing a channel quality parameter with a channel quality threshold, UE dynamically adjusts the channel quality parameter by using a channel quality weight parameter to obtain a channel statistic quality parameter, and selects, according to a result of comparing the channel statistic quality parameter with the channel quality threshold, whether to report CSI; therefore, UEs in a system can be evenly scheduled. Further, because all UEs that feed back CSI can use a same resource to perform feedback, a resource overhead required for feedback can be further reduced.

Corresponding to the embodiments of the CSI feedback method and the UE scheduling method according to the present invention, the present invention further provides embodiments of UE and a base station to which the foregoing method embodiments are applied.

Figure 5:
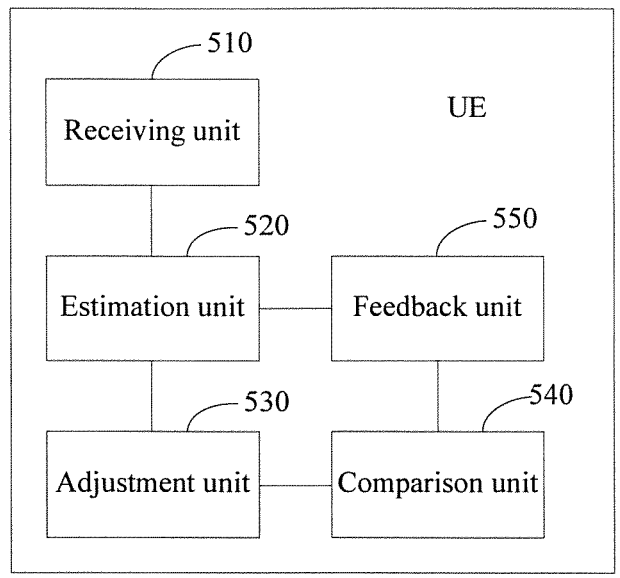
FIG. 5 is a block diagram of an embodiment of UE according to the present invention.

Refer to FIG. 5, which is a block diagram of an embodiment of UE according to the present invention.

The UE includes: a receiving unit 510, an estimation unit 520, an adjustment unit 530, a comparison unit 540, and a feedback unit 550.

The receiving unit 510 is configured to receive a reference signal broadcast by a base station.

The estimation unit 520 is configured to perform channel estimation on a radio channel between the base station and the UE by using the reference signal received by the receiving unit 510, to obtain channel state information CSI and a channel quality parameter.

The adjustment unit 530 is configured to adjust, according to a channel quality weight parameter, the channel quality parameter obtained by the estimation unit 520, to obtain a channel statistic quality parameter.

The comparison unit 540 is configured to compare the channel statistic quality parameter obtained by the adjustment unit 530 with a channel quality threshold.

The feedback unit 550 is configured to: when a comparison result of the comparison unit 540 is that the channel statistic quality parameter exceeds the channel quality threshold, feed back, to the base station, the CSI obtained by the estimation unit 520.

Figure 6:
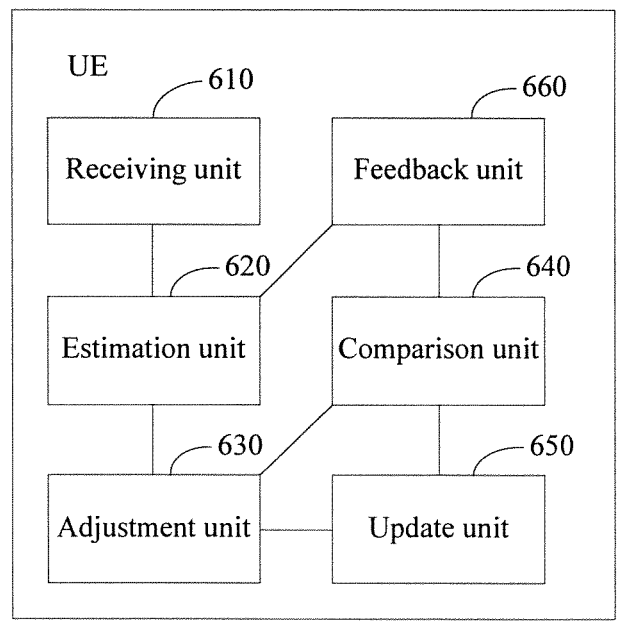
FIG. 6 is a block diagram of another embodiment of UE according to the present invention.

Refer to FIG. 6, which is a block diagram of another embodiment of UE according to the present invention.

The UE includes: a receiving unit 610, an estimation unit 620, an adjustment unit 630, a comparison unit 640, an update unit 650, and a feedback unit 660.

The receiving unit 610 is configured to receive a reference signal broadcast by a base station.

The estimation unit 620 is configured to perform channel estimation on a radio channel between the base station and the UE by using the reference signal received by the receiving unit 610, to obtain channel state information CSI and a channel quality parameter.

The adjustment unit 630 is configured to determine that a product of the channel quality weight parameter and the channel quality parameter that is obtained by the estimation unit 620 is a channel statistic quality parameter.

The comparison unit 640 is configured to compare the channel statistic quality parameter obtained by the adjustment unit 630 with a channel quality threshold.

The update unit 650 is configured to: when a comparison result of the comparison unit 640 is that the channel statistic quality parameter exceeds the channel quality threshold, update the channel quality weight parameter by using a step adjustment value to obtain a first channel quality weight parameter, where the channel quality weight parameter after being updated is less than the channel quality weight parameter before being updated; or, when a comparison result of the comparison unit 640 is that the channel statistic quality parameter does not exceed the channel quality threshold, update the channel quality weight parameter by using the step adjustment value to obtain a second channel quality weight parameter, where the channel quality weight parameter after being updated is greater than the channel quality weight parameter before being updated.

The feedback unit 660 is configured to: when the comparison result of the comparison unit 650 is that the channel statistic quality parameter exceeds the channel quality threshold, feed back, to the base station, the CSI obtained by the estimation unit.

In an optional implementation manner:

the feedback unit 660 may be specifically configured to feed back the CSI to the base station by using a time-frequency resource allocated by the base station to the UE.

In another optional implementation manner:

the receiving unit 610 may be further configured to receive a coding sequence seed allocated by the base station to the UE; and the feedback unit 660 may include (not shown in FIG. 6):

a first sequence generation subunit, configured to generate an M-dimensional Gaussian random sequence according to the coding sequence seed received by the receiving unit 610, where M is an integer greater than 1; a first CSI coding subunit, configured to code the CSI by using the M-dimensional Gaussian random sequence generated by the first sequence generation subunit, to obtain an M-dimensional vector signal; and a first signal feedback subunit, configured to feed back, to the base station by using M sub-resources, the M-dimensional vector signal obtained by the first CSI coding subunit.

In another optional implementation manner:

the estimation unit 620 may include (not shown in FIG. 6):

a quality calculation subunit, configured to calculate a channel quality parameter, of the reference signal received by the receiving unit 610, on each subband of multiple subbands obtained by dividing a channel bandwidth; a subband selection subunit, configured to select, from the multiple subbands, a subband having an optimal channel quality parameter calculated by the quality calculation subunit, and determine that the subband having the optimal channel quality parameter is an optimal subband of the UE; and a CSI estimation subunit, configured to perform channel estimation on a radio channel between the base station and the UE by using the reference signal, to obtain CSI of the UE on the optimal subband selected by the subband selection subunit;

the adjustment unit 630 may be specifically configured to adjust, according to the channel quality weight parameter, the channel quality parameter of the optimal subband selected by the subband selection subunit, to obtain a channel statistic quality parameter of the optimal subband;

the comparison unit 640 may be specifically configured to compare the channel statistic quality parameter, of the optimal subband, obtained by the adjustment unit 630 with the channel quality threshold; and the feedback unit 660 may be specifically configured to: when the comparison result of the comparison unit 640 is that the channel statistic quality parameter of the optimal subband exceeds the channel quality threshold, feed back, to the base station in a feedback stage which the optimal subband corresponds to, the CSI on the optimal subband.

Further, the receiving unit 610 may be further configured to receive a coding sequence seed allocated by the base station to the UE; and the feedback unit 660 may include (not shown in FIG. 6):

a second sequence generation subunit, configured to generate an M-dimensional Gaussian random sequence according to the coding sequence seed received by the receiving unit 610, where M is an integer greater than 1; a second CSI coding subunit, configured to code the CSI on the optimal subband by using the M-dimensional Gaussian random sequence generated by the second sequence generation subunit, to obtain an M-dimensional vector signal; and a second signal feedback subunit, feeding back, by using M sub-resources to the base station in the feedback stage which the optimal subband corresponds to, the M-dimensional vector signal obtained by the second CSI coding subunit.

Figure 7:
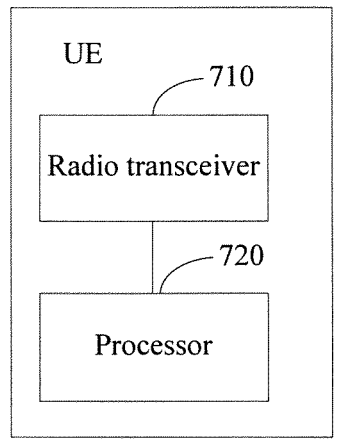
FIG. 7 is a block diagram of still another embodiment of UE according to the present invention.

Refer to FIG. 7, which is a block diagram of still another embodiment of UE according to the present invention.

The UE includes: a radio transceiver 710 and a processor 720.

The radio transceiver 710 is configured to receive a reference signal broadcast by a base station.

The processor 720 is configured to perform channel estimation on a radio channel between the base station and the UE by using the reference signal, to obtain channel state information CSI and a channel quality parameter, adjust the channel quality parameter according to a channel quality weight parameter, to obtain a channel statistic quality parameter, compare the channel statistic quality parameter with a channel quality threshold, and when the channel statistic quality parameter exceeds the channel quality threshold, feed back the CSI to the base station by using the radio transceiver 710, so that the base station selects UE from UEs that feed back the CSI, and schedules the UE.

In an optional implementation manner:

the processor 720 may be specifically configured to determine that a product of the channel quality weight parameter and the channel quality parameter is a channel statistic quality parameter; and the processor 720 may be further configured to: when the channel statistic quality parameter exceeds the channel quality threshold, update the channel quality weight parameter by using a step adjustment value to obtain a first channel quality weight parameter, where the channel quality weight parameter after being updated is less than the channel quality weight parameter before being updated; or, when the channel statistic quality parameter does not exceed the channel quality threshold, update the channel quality weight parameter by using the step adjustment value to obtain a second channel quality weight parameter, where the channel quality weight parameter after being updated is greater than the channel quality weight parameter before being updated.

In another optional implementation manner:

the processor 720 may be specifically configured to feed back the CSI to the base station by using the radio transceiver 710 on a time-frequency resource allocated by the base station to the UE.

In another optional implementation manner:

the radio transceiver 710 may be further configured to receive a coding sequence seed allocated by the base station to the UE; and the processor 720 may be specifically configured to generate an M-dimensional Gaussian random sequence according to the coding sequence seed, code the CSI by using the M-dimensional Gaussian random sequence, to obtain an M-dimensional vector signal, and feed back the M-dimensional vector signal to the base station by using M sub-resources, where M is an integer greater than 1.

In another optional implementation manner:

the processor 720 may be specifically configured to calculate a channel quality parameter of the reference signal on each subband of multiple subbands obtained by dividing a channel bandwidth, select, from the multiple subbands, a subband having an optimal channel quality parameter, determine that the subband having the optimal channel quality parameter is an optimal subband of the UE, perform channel estimation on a radio channel between the base station and the UE by using the reference signal, to obtain CSI of the UE on the optimal subband, adjust the channel quality parameter of the optimal subband according to the channel quality weight parameter, to obtain a channel statistic quality parameter of the optimal subband, compare the channel statistic quality parameter of the optimal subband with a channel quality threshold, and when the channel statistic quality parameter of the optimal subband exceeds the channel quality threshold, feed back, to the base station in a feedback stage which the optimal subband corresponds to, the CSI on the optimal subband.

Further, the radio transceiver 710 may be further configured to receive a coding sequence seed allocated by the base station to the UE; and the processor 720 may be specifically configured to generate an M-dimensional Gaussian random sequence according to the coding sequence seed, code the CSI on the optimal subband by using the M-dimensional Gaussian random sequence, to obtain an M-dimensional vector signal, and feed back, in the feedback stage which the optimal subband corresponds to, the M-dimensional vector signal to the base station by using M sub-resources, where M is an integer greater than 1.

Figure 8:
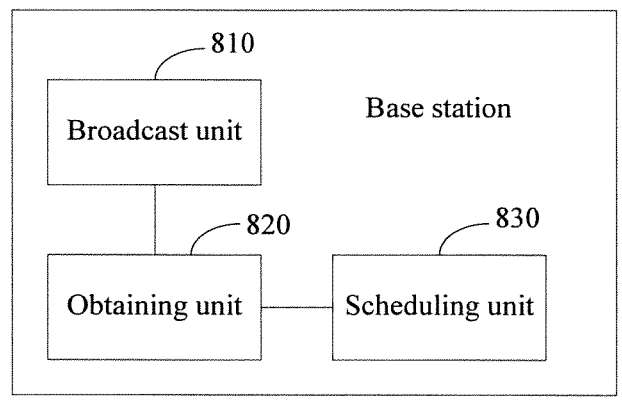
FIG. 8 is a block diagram of an embodiment of a base station according to the present invention.

Refer to FIG. 8, which is a block diagram of an embodiment of a base station according to the present invention:

The base station includes: a broadcast unit 810, an obtaining unit 820, and a scheduling unit 830.

The broadcast unit 810 is configured to broadcast a reference signal, so that UEs that receive the reference signal perform channel estimation on radio channels between the base station and the UEs by using the reference signal, to obtain CSI and channel quality parameters.

The obtaining unit 820 is configured to obtain CSI fed back by first UEs, where the first UEs are UEs, whose channel statistic quality parameters exceed a channel quality threshold, of the UEs that receive the reference signal broadcast by the broadcast unit 810, where the channel statistic quality parameter is a parameter obtained after the first UE adjusts a channel quality parameter of the first UE according to a channel quality weight parameter.

The scheduling unit 830 is configured to select UE from the first UEs according to the CSI fed back by the first UEs and obtained by the obtaining unit 820, and schedule the UE.

In an optional implementation manner:

the obtaining unit 820 may be specifically configured to receive the CSI that is fed back by the first UEs to the base station by using time-frequency resources allocated by the base station to the first UEs.

In another optional implementation manner:

the base station may further include (not shown in FIG. 8): a first allocation unit, configured to allocate a coding sequence seed to each UE; and correspondingly, the obtaining unit 820 may include (not shown in FIG. 8):

a first signal receiving subunit, configured to receive M-dimensional vector signals fed back by using M sub-resources by the first UEs, where the M-dimensional vector signal is an M-dimensional vector signal obtained after the first UE generates an M-dimensional Gaussian random sequence according to the allocated coding sequence seed, and codes the CSI by using the M-dimensional Gaussian random sequence, where M is an integer greater than 1; and a first signal reconstruction subunit, configured to reconstruct the M-dimensional vector signals received by the signal receiving subunit, to obtain the CSI of each UE of the first UEs.

In another optional implementation manner:

the obtaining unit 820 may be specifically configured to obtain, in a feedback stage corresponding to any one subband of multiple subbands obtained by dividing a channel bandwidth, first CSI fed back by first UEs that use the one subband as an optimal subband, where the optimal subband is a subband that is selected, after the first UE calculates a channel quality parameter of the reference signal on each subband of the multiple subbands, from the multiple subbands and has an optimal channel quality parameter, and the first CSI is CSI, of the first UE on the optimal subband, obtained after the first UE performs channel estimation on the radio channel between the base station and the UE by using the reference signal; and the scheduling unit 830 may be specifically configured to: in the feedback stage corresponding to the any one subband, select UE from the first UEs according to the first CSI fed back by the first UEs that use the one subband as the optimal subband and obtained by the obtaining unit 820, and schedule the UE on the one subband.

Further, the base station may further include (not shown in FIG. 8): a second allocation unit, configured to allocate a coding sequence seed to each UE; and correspondingly, the obtaining unit 820 may include (not shown in FIG. 8):

a first signal receiving subunit, configured to receive M-dimensional vector signals fed back by using M sub-resources by the first UEs that use the one subband as the optimal subband, where the M-dimensional vector signal is an M-dimensional vector signal obtained after the first UE generates an M-dimensional Gaussian random sequence according to the allocated coding sequence seed, and codes the first CSI by using the M-dimensional Gaussian random sequence, where M is an integer greater than 1; and a first signal reconstruction subunit, configured to reconstruct the M-dimensional vector signals received by the first signal receiving subunit, to obtain the first CSI fed back on the one subband by each UE of the first UEs.

Figure 9:
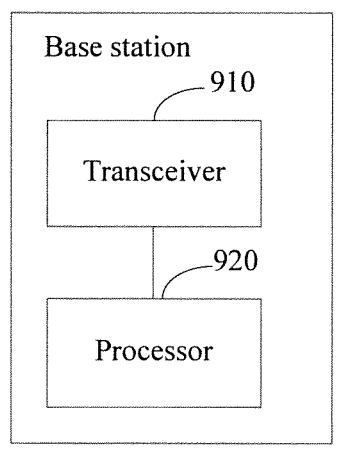
FIG. 9 is a block diagram of another embodiment of a base station according to the present invention.

Refer to FIG. 9, which is a block diagram of another embodiment of a base station according to the present invention.

The base station includes: a transceiver 910 and a processor 920.

The transceiver 910, is configured to enable UEs that receive the reference signal perform channel estimation on radio channels between the base station and the UEs by using the reference signal, to obtain CSI and channel quality parameters.

The processor 920 is configured to obtain CSI fed back by first UEs, select UE from the first UEs according to the CSI fed back by the first UEs, and schedule the UE, where the first UEs are UEs, whose channel statistic quality parameters exceed a channel quality threshold, of the UEs that receive the reference signal, and the channel statistic quality parameter is a parameter obtained after the first UE adjusts a channel quality parameter of the first UE according to a channel quality weight parameter.

In an optional implementation manner:

the processor 920 may be specifically configured to receive, by using the transceiver 910, the CSI that is fed back by the first UEs to the base station by using time-frequency resources allocated by the base station to the first UEs.

In another optional implementation manner:

the processor 920 may be further configured to allocate a coding sequence seed to each UE; and the processor 920 may be specifically configured to receive, by using the transceiver 910, M-dimensional vector signals fed back by using M sub-resources by the first UEs, and reconstruct the M-dimensional vector signals, to obtain the CSI of each UE of the first UEs, where the M-dimensional vector signal is an M-dimensional vector signal obtained after the first UE generates an M-dimensional Gaussian random sequence according to the allocated coding sequence seed, and codes the CSI by using the M-dimensional Gaussian random sequence, where M is an integer greater than 1.

In another optional implementation manner:

the processor 920 may be specifically configured to obtain, in a feedback stage corresponding to any one subband of multiple subbands obtained by dividing a channel bandwidth, first CSI fed back by first UEs that use the one subband as an optimal subband, select UE from the first UEs according to the first CSI fed back by the first UEs that use the one subband as the optimal subband, and schedule the UE on the one subband, where the optimal subband is a subband that is selected, after the first UE calculates a channel quality parameter of the reference signal on each subband of the multiple subbands, from the multiple subbands and has an optimal channel quality parameter, and the first CSI is CSI, of the first UE on the optimal subband, obtained after the first UE performs channel estimation on the radio channel between the base station and the UE by using the reference signal.

Further, the processor 920 may be further configured to allocate a coding sequence seed to each UE; and the processor 920 may be specifically configured to receive, by using the transceiver 910, M-dimensional vector signals fed back by using M sub-resources by the first UEs that use the one subband as the optimal subband, and reconstruct the M-dimensional vector signals, to obtain the first CSI fed back on the one subband by each UE of the first UEs, where the M-dimensional vector signal is an M-dimensional vector signal obtained after the first UE generates an M-dimensional Gaussian random sequence according to the allocated coding sequence seed, and codes the first CSI by using the M-dimensional Gaussian random sequence, where M is an integer greater than 1.

As can be seen from the foregoing embodiments, in the embodiments of the present invention, instead of directly comparing a channel quality parameter with a channel quality threshold, UE dynamically adjusts the channel quality parameter by using a channel quality weight parameter to obtain a channel statistic quality parameter, and selects, according to a result of comparing the channel statistic quality parameter with the channel quality threshold, whether to report CSI; therefore, UEs in a system can be evenly scheduled. For example, for UE that is at an edge of a cell and has relatively poor channel quality, each time after the UE is not scheduled by a base station, a channel quality weight parameter may be increased, so as to increase a channel statistic quality parameter a next time, so that a probability of reporting CSI is increased; for UE having better channel quality, each time after the UE is scheduled by the base station, a channel quality weight parameter may be reduced, so as to reduce a channel statistic quality parameter a next time, so that a probability of reporting CSI is reduced, thereby ensuring that all UEs can be evenly scheduled by the base station.

A person skilled in the art may clearly understand that, the technologies in the embodiments of the present invention may be implemented by software in addition to a necessary general hardware platform. Based on such an understanding, the technical solutions in the embodiments of the present invention essentially, or the part contributing to the prior art may be implemented in the form of a software product. The computer software product is stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, refer to these embodiments, and each embodiment focuses on a difference from other embodiments. Especially, a system embodiment is basically similar to a method embodiment, and therefore is described briefly; for related parts, refer to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A channel state information (CSI) feedback method, comprising:
   receiving, by a user equipment (UE), a reference signal broadcast by a base station;
   performing channel estimation on a radio channel between the base station and the UE by using the reference signal, to obtain CSI and a channel quality parameter;
   adjusting the channel quality parameter according to a channel quality weight parameter, to obtain a channel statistic quality parameter;
   comparing the channel statistic quality parameter with a channel quality threshold; and
   feeding back the CSI to the base station when the channel statistic quality parameter exceeds the channel quality threshold; wherein:
   before receiving, by the UE, the reference signal broadcast by the base station, the method further comprises:
      receiving a coding sequence seed allocated by the base station to the UE; and
   feeding back the CSI to the base station comprises:
      generating an M-dimensional Gaussian random sequence according to the coding sequence seed, wherein M is an integer greater than 1,
      coding the CSI by using the M-dimensional Gaussian random sequence, to obtain an M-dimensional vector signal, and
      feeding back the M-dimensional vector signal to the base station by using M sub-resources.

2. The method according to claim 1, wherein:
   adjusting the channel quality parameter according to the channel quality weight parameter, to obtain the channel statistic quality parameter comprises:
      determining that a product of the channel quality weight parameter and the channel quality parameter is the channel statistic quality parameter; and
   after comparing the channel statistic quality parameter with a channel quality threshold, the method further comprises:
      when the channel statistic quality parameter exceeds the channel quality threshold, updating the channel quality weight parameter by using a step adjustment value, wherein the channel quality weight parameter after being updated is less than the channel quality weight parameter before being updated, or
      when the channel statistic quality parameter does not exceed the channel quality threshold, updating the channel quality weight parameter by using the step adjustment value, wherein the channel quality weight parameter after being updated is greater than the channel quality weight parameter before being updated.

3. The method according to claim 1, wherein feeding back the CSI to the base station comprises:
   feeding back the CSI to the base station by using a time-frequency resource allocated by the base station to the UE.

4. The method according to claim 1, wherein:
   performing channel estimation on the radio channel between the base station and the UE by using the reference signal, to obtain the CSI and the channel quality parameter comprises:

calculating a channel quality parameter of the reference signal on each subband of multiple subbands obtained by dividing a channel bandwidth, selecting, from the multiple subbands, a subband having an optimal channel quality parameter, and determining that the subband having the optimal channel quality parameter is an optimal subband of the UE, and performing channel estimation on the radio channel between the base station and the UE by using the reference signal, to obtain CSI of the UE on the optimal subband;

adjusting the channel quality parameter according to the channel quality weight parameter, to obtain the channel statistic quality parameter comprises:

adjusting the channel quality parameter of the optimal subband according to the channel quality weight parameter, to obtain a channel statistic quality parameter of the optimal subband;

comparing the channel statistic quality parameter with the channel quality threshold comprises:

comparing the channel statistic quality parameter of the optimal subband with the channel quality threshold; and feeding back the CSI to the base station when the channel statistic quality parameter exceeds the channel quality threshold comprises:

when the channel statistic quality parameter of the optimal subband exceeds the channel quality threshold, feeding back, to the base station in a feedback stage which the optimal subband corresponds to, the CSI on the optimal subband.

5. A channel state information (CSI) feedback method, comprising:

receiving, by a user equipment (UE), a reference signal broadcast by a base station;

performing channel estimation on a radio channel between the base station and the UE by using the reference signal, to obtain CSI and a channel quality parameter;

adjusting the channel quality parameter according to a channel quality weight parameter, to obtain a channel statistic quality parameter;

comparing the channel statistic quality parameter with a channel quality threshold; and feeding back the CSI to the base station when the channel statistic quality parameter exceeds the channel quality threshold; wherein:

performing channel estimation on the radio channel between the base station and the UE by using the reference signal, to obtain the CSI and the channel quality parameter comprises:

calculating a channel quality parameter of the reference signal on each subband of multiple subbands obtained by dividing a channel bandwidth, selecting, from the multiple subbands, a subband having an optimal channel quality parameter, and determining that the subband having the optimal channel quality parameter is an optimal subband of the UE, and performing channel estimation on the radio channel between the base station and the UE by using the reference signal, to obtain CSI of the UE on the optimal subband;

adjusting the channel quality parameter according to the channel quality weight parameter, to obtain the channel statistic quality parameter comprises:

adjusting the channel quality parameter of the optimal subband according to the channel quality weight parameter, to obtain a channel statistic quality parameter of the optimal subband;

comparing the channel statistic quality parameter with the channel quality threshold comprises:

comparing the channel statistic quality parameter of the optimal subband with the channel quality threshold; and feeding back the CSI to the base station when the channel statistic quality parameter exceeds the channel quality threshold comprises:

when the channel statistic quality parameter of the optimal subband exceeds the channel quality threshold, feeding back, to the base station in a feedback stage which the optimal subband corresponds to, the CSI on the optimal subband; wherein:

before receiving, by the UE, the reference signal broadcast by the base station, the method further comprises:

receiving a coding sequence seed allocated by the base station to the UE; and feeding back, to the base station in a feedback stage which the optimal subband corresponds to, the CSI on the optimal subband comprises:

generating an M-dimensional Gaussian random sequence according to the coding sequence seed, wherein M is an integer greater than 1, coding the CSI on the optimal subband by using the M-dimensional Gaussian random sequence, to obtain an M-dimensional vector signal, and feeding back, in the feedback stage which the optimal subband corresponds to, the M-dimensional vector signal to the base station by using M sub-resources.

6. The method according to claim 1, wherein an initial value of the channel quality weight parameter is a preset weight parameter.

7. User equipment (UE), comprising:

a processor; and memory coupled to the processor, the memory comprising instructions that, when executed by the processor, cause the UE to:

receive a reference signal broadcast by a base station;

perform channel estimation on a radio channel between the base station and the UE by using the received reference signal, to obtain channel state information (CSI) and a channel quality parameter;

adjust, according to a channel quality weight parameter, the obtained channel quality parameter, to obtain a channel statistic quality parameter;

compare the obtained channel statistic quality parameter with a channel quality threshold;

when a comparison result is that the channel statistic quality parameter exceeds the channel quality threshold, feed back, to the base station, the obtained CSI;

receive a coding sequence seed allocated by the base station to the UE;

generate an M-dimensional Gaussian random sequence according to the received coding sequence seed, wherein M is an integer greater than 1;

code the CSI by using the M-dimensional Gaussian random sequence, to obtain an M-dimensional vector signal; and feed back, to the base station by using M sub-resources, the obtained M-dimensional vector signal.

8. The UE according to claim 7, wherein the memory further comprises instructions that, when executed by the processor, cause the UE to:
  determine that a product of the channel quality weight parameter and the channel quality parameter is the channel statistic quality parameter; and
  when the comparison result is that the channel statistic quality parameter exceeds the channel quality threshold, update the channel quality weight parameter by using a step adjustment value to obtain a first channel quality weight parameter, wherein the channel quality weight parameter after being updated is less than the channel quality weight parameter before being updated, or
  when the comparison result is that the channel statistic quality parameter does not exceed the channel quality threshold, update the channel quality weight parameter by using the step adjustment value to obtain a second channel quality weight parameter, wherein the channel quality weight parameter after being updated is greater than the channel quality weight parameter before being updated.

9. The UE according to claim 7, wherein the memory further comprises instructions that, when executed by the processor, cause the UE to feed back the CSI to the base station by using a time-frequency resource allocated by the base station to the UE.

10. The UE according to claim 7, wherein the memory further comprises instructions that, when executed by the processor, cause the UE to:
  calculate a channel quality parameter, of the received reference signal, on each subband of multiple subbands obtained by dividing a channel bandwidth,
  select, from the multiple subbands, a subband having an optimal channel quality parameter, and determine that the subband having the optimal channel quality parameter is an optimal subband of the UE, and
  perform channel estimation on a radio channel between the base station and the UE by using the reference signal, to obtain CSI of the UE on the selected optimal subband;
  adjust, according to the channel quality weight parameter, the channel quality parameter of the selected optimal subband, to obtain a channel statistic quality parameter of the optimal subband;
  compare the obtained channel statistic quality parameter, of the optimal subband, with the channel quality threshold; and
  when the comparison result is that the channel statistic quality parameter of the optimal subband exceeds the channel quality threshold, feed back, to the base station in a feedback stage which the optimal subband corresponds to, the CSI on the optimal subband.

11. User equipment (UE), comprising:
  a processor; and
  memory coupled to the processor, the memory comprising instructions that, when executed by the processor, cause the UE to:
    receive a reference signal broadcast by a base station;
    perform channel estimation on a radio channel between the base station and the UE by using the received reference signal, to obtain channel state information (CSI) and a channel quality parameter;
    adjust, according to a channel quality weight parameter, the obtained channel quality parameter, to obtain a channel statistic quality parameter;
    compare the obtained channel statistic quality parameter with a channel quality threshold;
    when a comparison result is that the channel statistic quality parameter exceeds the channel quality threshold, feed back, to the base station, the obtained CSI;
    calculate a channel quality parameter, of the received reference signal, on each subband of multiple subbands obtained by dividing a channel bandwidth;
    select, from the multiple subbands, a subband having an optimal channel quality parameter, and determine that the subband having the optimal channel quality parameter is an optimal subband of the UE;
    perform channel estimation on a radio channel between the base station and the UE by using the reference signal, to obtain CSI of the UE on the selected optimal subband;
    adjust, according to the channel quality weight parameter, the channel quality parameter of the selected optimal subband, to obtain a channel statistic quality parameter of the optimal subband;
    compare the obtained channel statistic quality parameter, of the optimal subband, with the channel quality threshold;
    when the comparison result is that the channel statistic quality parameter of the optimal subband exceeds the channel quality threshold, feed back, to the base station in a feedback stage which the optimal subband corresponds to, the CSI on the optimal subband;
    receive a coding sequence seed allocated by the base station to the UE;
    generate an M-dimensional Gaussian random sequence according to the received coding sequence seed, wherein M is an integer greater than 1;
    code the CSI on the optimal subband by using the generated M-dimensional Gaussian random sequence, to obtain an M-dimensional vector signal; and
    feed back, by using M sub-resources to the base station in the feedback stage which the optimal subband corresponds to, the obtained M-dimensional vector signal.

12. A base station, comprising:
  a processor; and
  memory coupled to the processor, the memory comprising instructions that, when executed by the processor, cause the base station to:
    broadcast a reference signal, so that user equipments (UEs) that receive the reference signal perform channel estimation on radio channels between the base station and the UEs by using the reference signal, to obtain channel state information (CSI) and channel quality parameters;
    obtain the CSI fed back by first UEs, wherein the first UEs are UEs, whose channel statistic quality parameters exceed a channel quality threshold, of the UEs that receive the broadcast reference signal, wherein the channel statistic quality parameter is a parameter obtained after the first UE adjusts a channel quality parameter of the first UE according to a channel quality weight parameter;
    allocate a coding sequence seed to each UE;
    receive M-dimensional vector signals fed back by using M sub-resources by the first UEs, wherein the M-dimensional vector signal is an M-dimensional vector signal obtained after the first UE generates an M-dimensional Gaussian random sequence according to the allocated coding sequence seed, and codes the CSI by using the M-dimensional Gaussian random sequence, wherein M is an integer greater than 1;

reconstruct the received M-dimensional vector signals, to obtain the CSI of each UE of the first UEs; and select a UE from the first UEs according to the obtained CSI fed back by the first UEs, and schedule the UE.

13. The base station according to claim 12, wherein the memory further comprises instructions that, when executed by the processor, cause the base station to receive the CSI that is fed back by the first UEs to the base station by using time-frequency resources allocated by the base station to the first UEs.

14. The base station according to claim 12, wherein the memory further comprises instructions that, when executed by the processor, cause the base station to:

obtain, in a feedback stage corresponding to any one subband of multiple subbands obtained by dividing a channel bandwidth, first CSI fed back by first UEs that use the one subband as an optimal subband, wherein the optimal subband is a subband that is selected, after the first UE calculates a channel quality parameter of the reference signal on each subband of the multiple subbands, from the multiple subbands and has an optimal channel quality parameter, and the first CSI is CSI, of the first UE on the optimal subband, obtained after the first UE performs channel estimation on the radio channel between the base station and the UE by using the reference signal; and in the feedback stage corresponding to the any one subband, select UE from the first UEs according to the first CSI fed back by the first UEs that use the obtained one subband as the optimal subband, and schedule the UE on the one subband.

15. A base station, comprising:

a processor; and memory coupled to the processor, the memory comprising instructions that, when executed by the processor, cause the base station to:

broadcast a reference signal, so that user equipments (UEs) that receive the reference signal perform channel estimation on radio channels between the base station and the UEs by using the reference signal, to obtain channel state information (CSI) and channel quality parameters;

obtain the CSI fed back by first UEs, wherein the first UEs are UEs, whose channel statistic quality parameters exceed a channel quality threshold, of the UEs that receive the broadcast reference signal, wherein the channel statistic quality parameter is a parameter obtained after the first UE adjusts a channel quality parameter of the first UE according to a channel quality weight parameter;

select a UE from the first UEs according to the obtained CSI fed back by the first UEs, and schedule the UE;

obtain, in a feedback stage corresponding to any one subband of multiple subbands obtained by dividing a channel bandwidth, first CSI fed back by first UEs that use the one subband as an optimal subband, wherein the optimal subband is a subband that is selected, after the first UE calculates a channel quality parameter of the reference signal on each subband of the multiple subbands, from the multiple subbands and has an optimal channel quality parameter, and the first CSI is CSI, of the first UE on the optimal subband, obtained after the first UE performs channel estimation on the radio channel between the base station and the UE by using the reference signal;

in the feedback stage corresponding to the any one subband, select UE from the first UEs according to the first CSI fed back by the first UEs that use the obtained one subband as the optimal subband, and schedule the UE on the one subband;

allocate a coding sequence seed to each UE;

receive M-dimensional vector signals fed back by using M sub-resources by the first UEs that use the one subband as the optimal subband, wherein the M-dimensional vector signal is an M-dimensional vector signal obtained after the first UE generates an M-dimensional Gaussian random sequence according to the allocated coding sequence seed, and codes the first CSI by using the M-dimensional Gaussian random sequence, wherein M is an integer greater than 1; and reconstruct the received M-dimensional vector signals, to obtain the first CSI fed back on the one subband by each UE of the first UEs.

* * * * *